United States Patent
Ruch et al.

[19]

[11] Patent Number: 5,933,321
[45] Date of Patent: Aug. 3, 1999

[54] PORTABLE COMPUTER DOCKING STATION HAVING MODULAR MOTORIZED DOCKING/UNDOCKING STRUCTURE

[75] Inventors: Mark H. Ruch, Woodlands; Jason Q. Paulsel, Conroe; E. R. Webb; Scott P. Saunders, both of Spring, all of Tex.

[73] Assignee: Compaq Computer Corporation, Houston, Tex.

[21] Appl. No.: 08/731,402

[22] Filed: Oct. 18, 1996

[51] Int. Cl.$^6$ ................................. G06F 1/16; H05K 7/12
[52] U.S. Cl. ............................................ 361/686; 439/374
[58] Field of Search ..................... 361/683, 685, 361/686, 724–727; 364/708.1; 312/223.1, 223.2; 439/374, 378

[56] References Cited

U.S. PATENT DOCUMENTS

| | | | |
|---|---|---|---|
| 5,313,596 | 5/1994 | Swindler et al. | 361/725 |
| 5,323,291 | 6/1994 | Boyle et al. | 361/683 |
| 5,347,425 | 9/1994 | Herron et al. | 361/683 |
| 5,463,742 | 10/1995 | Kobayashi | 361/688 |
| 5,477,415 | 12/1995 | Mitcham et al. | 361/686 |
| 5,612,927 | 3/1997 | Morrison et al. | 361/685 |

*Primary Examiner*—Lynn D. Feild
*Attorney, Agent, or Firm*—Konneker & Smith P.C.

[57] ABSTRACT

A portable computer docking station has incorporated therein a motorized docking/undocking module which is releasably latched to a housing wall portion of the docking station. The module includes a housing within which a small electric drive motor is operatively mounted, with wall portions of the module housing translationally and rotationally restraining the motor body without the use of screws or other separate fastening members. A docking control system, upon sensing the manual placement of a portable computer on a receiving area adjacent the module energizes the module motor which rotates a cammed worm gear portion of the module which is drivingly linked to latching and ejection portions of the module. The motor-driven latching portion of the module connects to the computer and docks it by forcibly drawing it toward the module in a manner mating facing connectors on the computer and docking station. When it is desired to undock the computer, a signal is transmitted to the control system which, in turn, energizes the module motor to cause the latching portion to release the docked computer, and the ejection portion to push the computer away from the module to thereby forcibly decouple the previously mated computer and docking station connectors.

47 Claims, 21 Drawing Sheets

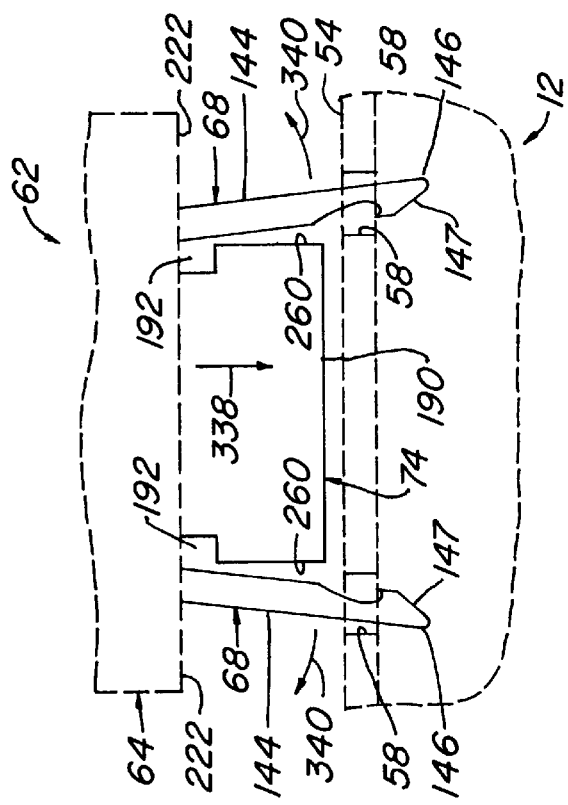
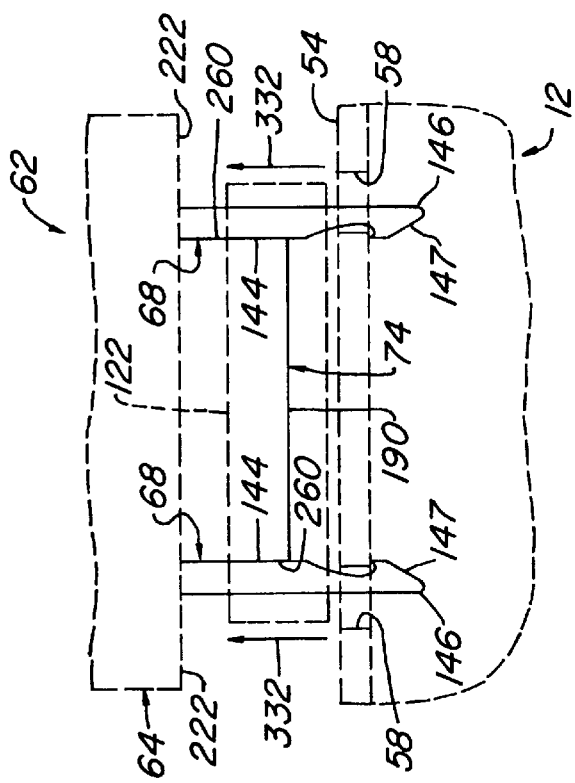

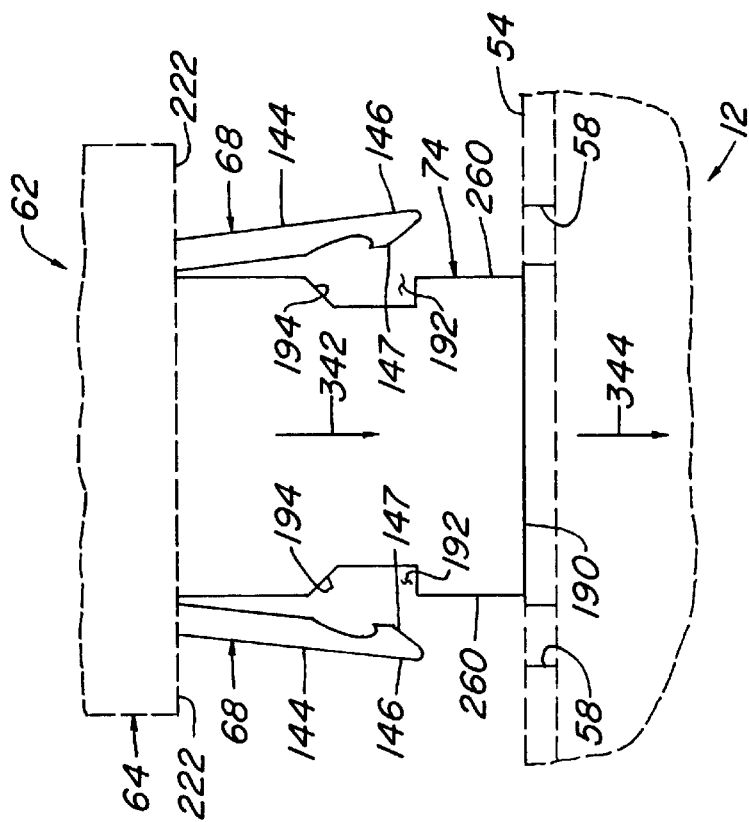
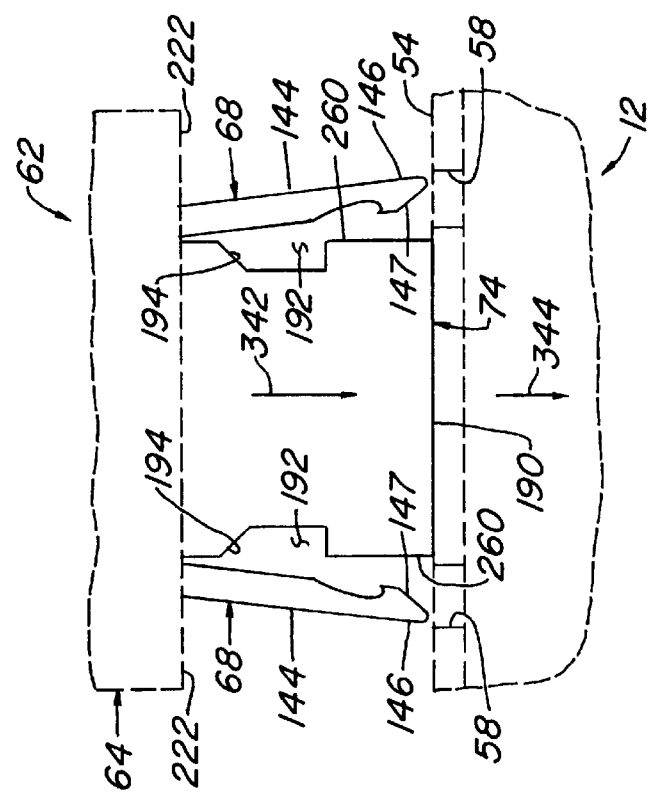

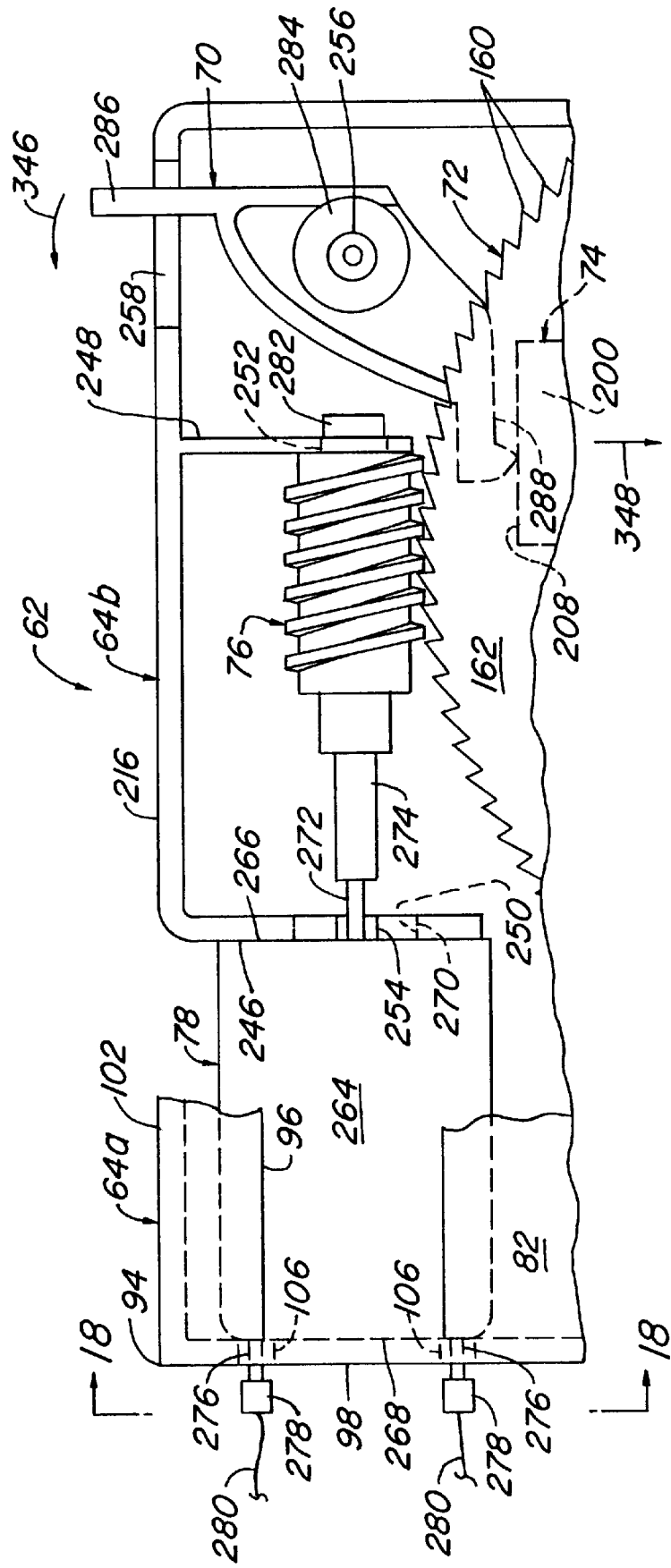

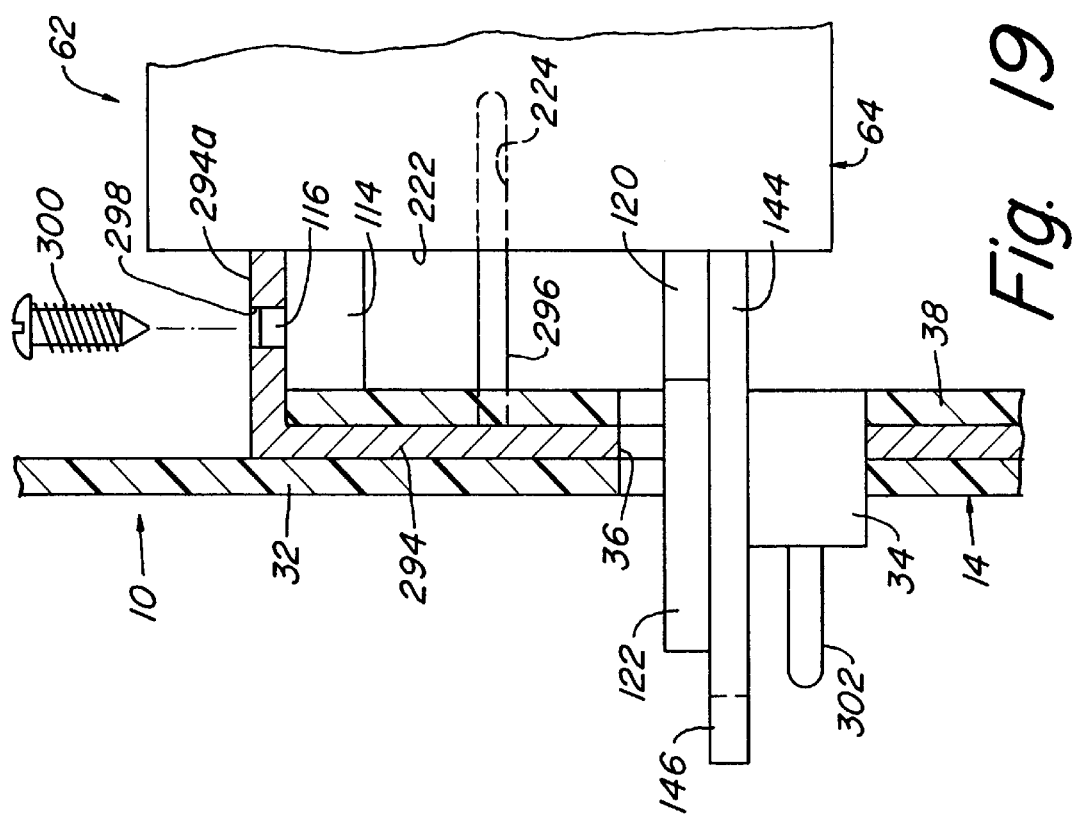
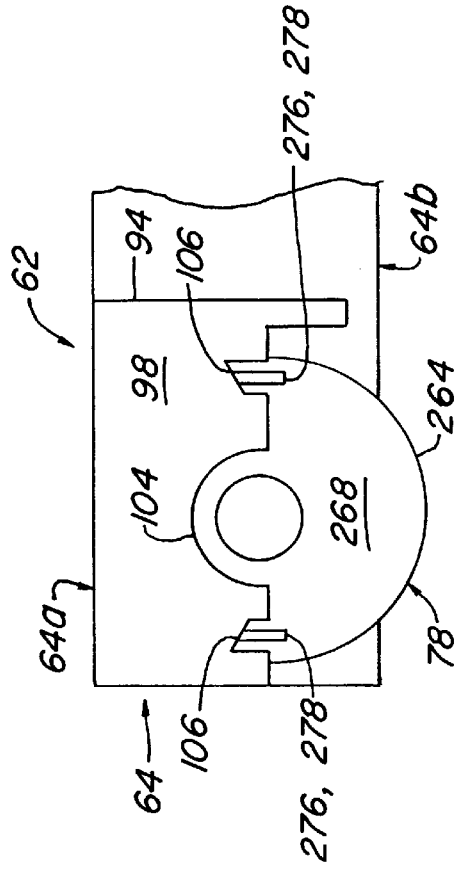

PORTABLE COMPUTER DOCKING STATION HAVING MODULAR MOTORIZED DOCKING/UNDOCKING STRUCTURE

BACKGROUND OF THE INVENTION

1. Field of the Invention

The present invention generally relates to electronic apparatus, and more particularly relates to docking station apparatus used to connect a portable computer to desktop computer peripheral devices such as a keyboard, monitor, printer and mouse.

2. Description of Related Art

In computer parlance a "docking station" is an interface device to which a portable computer, such as the increasingly popular notebook computer, may be operatively and removably coupled to connect its central processing unit and other internal circuitry to desktop computer peripheral devices such as a keyboard, monitor, printer and mouse. In this manner the portable computer may be used "on the road" by its owner, utilizing its own keyboard, monitor and mouse, and later used in a home or office desktop work station in conjunction with the larger desktop peripheral devices. Thus, a single computer can provide its user with both the compactness, light weight, portability and diminutive work space requirements of the notebook computer and the power and comfort of a desktop system with its larger work space and peripheral devices.

A conventionally configured docking station typically comprises a housing adapted to sit atop the desktop work space and containing the interface electronics used to connect the "docked" portable computer to the desktop peripheral devices operatively coupled to the docking station. The housing has a horizontal surface upon which the portable computer is rested, keyboard side up, before being horizontally moved rearwardly to removably couple a connector on the rear side of the computer to a corresponding docking connector on the docking station housing.

Initially, the initial computer connection and subsequent disconnection functions of docking stations were manually controlled—i.e., after an initial placement of the computer on the docking station receiving area, an appropriate hand or manual lever force was used to dock and undock the portable computer. This manual docking and undocking technique, though simple and straightforward, had several disadvantages. For example, it was frequently the case that the docking station user could not be sure whether the computer and docking station connectors were properly aligned, and (if they were) whether the docking connector mating was completely effected. Additionally, the typical manual docking process tended to be a cumbersome, two-handed process. Additionally, if the computer was engaged in an operation such as printing or a disk operation, manual undocking could easily lead to an unintentional loss of data.

In an attempt to alleviate these problems, various types of motorized docking systems were proposed. Using these types of mechanized docking systems, all that was necessary was for the user to initially place the computer on the docking station and manually initiate its motion toward the docking station connector to actuate the docking system. The actuated system automatically latched to the computer, pulled it toward the docking station connector and then forcibly mated the two connectors.

Although this type of previously proposed mechanical docking system solved some of the problems associated with the earlier manual docking systems, it presented various problems, limitations and disadvantages of its own. For example, it tended to be mechanically quite complex with numerous necessary parts, and therefore undesirably expensive to construct. Such complexity also resulted in decreased reliability and serviceability, as well as undesirably increasing the overall tolerance "stack-up" between the computer and docking station connectors. If this tolerance stack-up was not precisely controlled during the manufacturing process a connector-to-connector mismatch could easily result and prevent proper computer docking. Moreover, the user still had to exert appreciable manual force on the computer to permit the mechanical system to initiate and complete its automated computer docking process.

Other disadvantages in previously proposed motorized docking systems included the use therein of optical switches to verify docking and undocking (often leading to somewhat unreliable sensing of the docked/undocked state of the computer), and the possibility of a user's finger being pinched between the computer and the docking station as the computer was being motor-driven toward its docked position.

In view of the foregoing it can readily be seen that it would be highly desirable to provide a portable computer docking station having incorporated therein a mechanized docking system that eliminates or at least substantially reduces the above-mentioned problems, limitations and disadvantages of mechanized docking systems of the general type just described. It is accordingly an object of the present invention to provide such an improved portable computer docking station.

SUMMARY OF THE INVENTION

In carrying out principles of the present invention, in accordance with a preferred embodiment thereof, a portable computer docking station is provided that includes a docking station housing having a wall upon which a first electrical connector is mounted, and a receiving area along which a portable computer having a second electrical connector may be moved toward and away from the first electrical connector to respectively couple and uncouple the first and second electrical connectors.

According to a key aspect of the present invention, a specially designed motorized docking/undocking module is incorporated into the docking station. The module is removably connected, as a unit, to the docking station housing wall and includes a support structure, representatively a module housing which is removably latched to the docking station housing wall.

A latching structure is carried by the module housing for driven motion relative thereto through a docking movement in which the latching structure engages the computer and forcibly moves it toward the first electrical connector. An ejection structure is also carried by the module housing for driven motion relative thereto through an undocking movement in which the ejection structure disengages the computer from the latching structure and forcibly moves the computer away from the first electrical connector.

The module also includes a drive structure operative to sequentially force the latching and ejection structures through their docking and undocking movements. The drive structure includes a linking member drivingly interconnected between the latching and ejection structures, and an electric drive motor carried by the module housing and drivingly coupled to the linking member. Additionally, a control system is incorporated in the docking station and is operative to selectively energize and de-energize the drive motor.

In an illustrated preferred embodiment of the module the latching structure includes a generally plate-shaped sled structure translatably carried by the module housing and having opposite side edge portions, and a pair of elongated latch arm members having rear portions pivotally carried on the sled structure, outer end portions latchable to the computer, and intermediate longitudinal portions extending transversely to and interconnecting the front and rear end portions.

Representatively, the ejection structure includes an ejection plate member carried by the module housing for driven translational movement relative thereto toward and away from the computer. The linking member is a worm gear having first and second sides on which first and second cam structures are respectively disposed, with drive pins on the sled structure and the ejection plate member being respectively positioned for driving engagement by the first and second cam structures. The electric drive motor is drivingly linked to the worm gear through a drive worm operatively meshed with the worm gear. Preferably, the first and second cam structures are relatively positioned and configured to sequentially translate the latch arm members and the ejection plate member relative to the module housing in response to driven rotation of the worm gear in a single direction.

According to a feature of the invention, the electric drive motor has a body portion engaged by wall sections of the module housing in a manner restraining the motor body portion against appreciable rotational and translational movement relative to the module housing without the use of separate fastening members interconnecting the motor body portion to the module housing. According to another feature of the invention, first and second position sensing switches are carried by the module housing and are positioned to be sequentially engaged, during driven rotation of the worm gear, by first and second position sensing cam structures carried on a side of the worm gear. When contacted by their associated position sensing cam structures, the first and second position sensing switches respectively output first and second electrical signals. The module is also preferably provided with a security hood structure which, when the computer is docked, overlies and blocks access to the outer latch arm member ends to thereby deter theft of the docked computer.

According to still further features of the invention, the control system is operative to (1) terminate the rotation of the drive motor in response to the generation of either of the first and second position sensing switch signals; (2) sense the presence of a foreign object being pressed between the docking station housing the portable computer, during driven movement of the portable computer toward the first electrical connector by the module, and responsively reverse the rotation of the electrical drive motor to move the portable computer away from the first electrical connector; and (3) receive a presence signal from the portable computer and automatically move the latching structure, ejection structure and linking member from home docked positions thereof to home undocked positions thereof in the absence of such presence signal.

Representatively, the first electrical connector has first and second opposite end portions, and a central portion disposed between the first and second opposite end portions, mateable with corresponding portions of the second electrical connector. The first and second opposite end portions are configured to mate with the second electrical connector before the central portion does. The first electrical connector is operative to output first and second electrical signals respectively indicative of the mating of the first and second opposite end portions of the first electrical connector with the corresponding portions of the second electrical connector. The control system is operable to prevent energization of the electrical drive motor until both of these first and second electrical signals are generated.

In accordance with yet another feature of the invention the linking member is operative, while the latch arm members are latched to the portable computer, to (1) forcibly move the rear latch arm portions, in a first direction, in a manner driving the computer toward the first electrical connector through a first distance predetermined as necessary to fully mate the first and second electrical connectors, (2) further move the rear latch arm portions, in the first direction, through a second distance, in a manner causing resilient deflection of the aforementioned intermediate transverse latch arm member portions, and then (3) terminate the driving force on the rear latch arm portions to cause the relaxation of the resilient deflection of the intermediate latch arm member portions.

BRIEF DESCRIPTION OF THE DRAWINGS

FIGS. 16A–16F are simplified, partially phantomed top plan views respectively corresponding to the rotational worm gear positions in FIGS. 14A–14F and sequentially illustrating the positions of the hook arm and ejector plate portions of the modular docking and undocking structure, and their interactions with the portable computer, during the docking and undocking sequences;

FIG. 17 is a simplified, partially cut away top plan view of a portion of the modular docking/undocking structure taken generally along line 17—17 of FIG. 3 and illustrating, among other things, a screwless motor mount feature of the invention;

FIG. 18 is a partial side elevational view of the modular docking/undocking structure taken generally along line 18—18 of FIG. 17; and FIG. 19 is an enlarged scale, simplified cross-sectional view through a portion of the modular docking/undocking structure, taken generally along line 19—19 of FIG. 1, illustrating the latching connection of the docking/undocking structure to the docking station housing.

DETAILED DESCRIPTION

Figure 1:
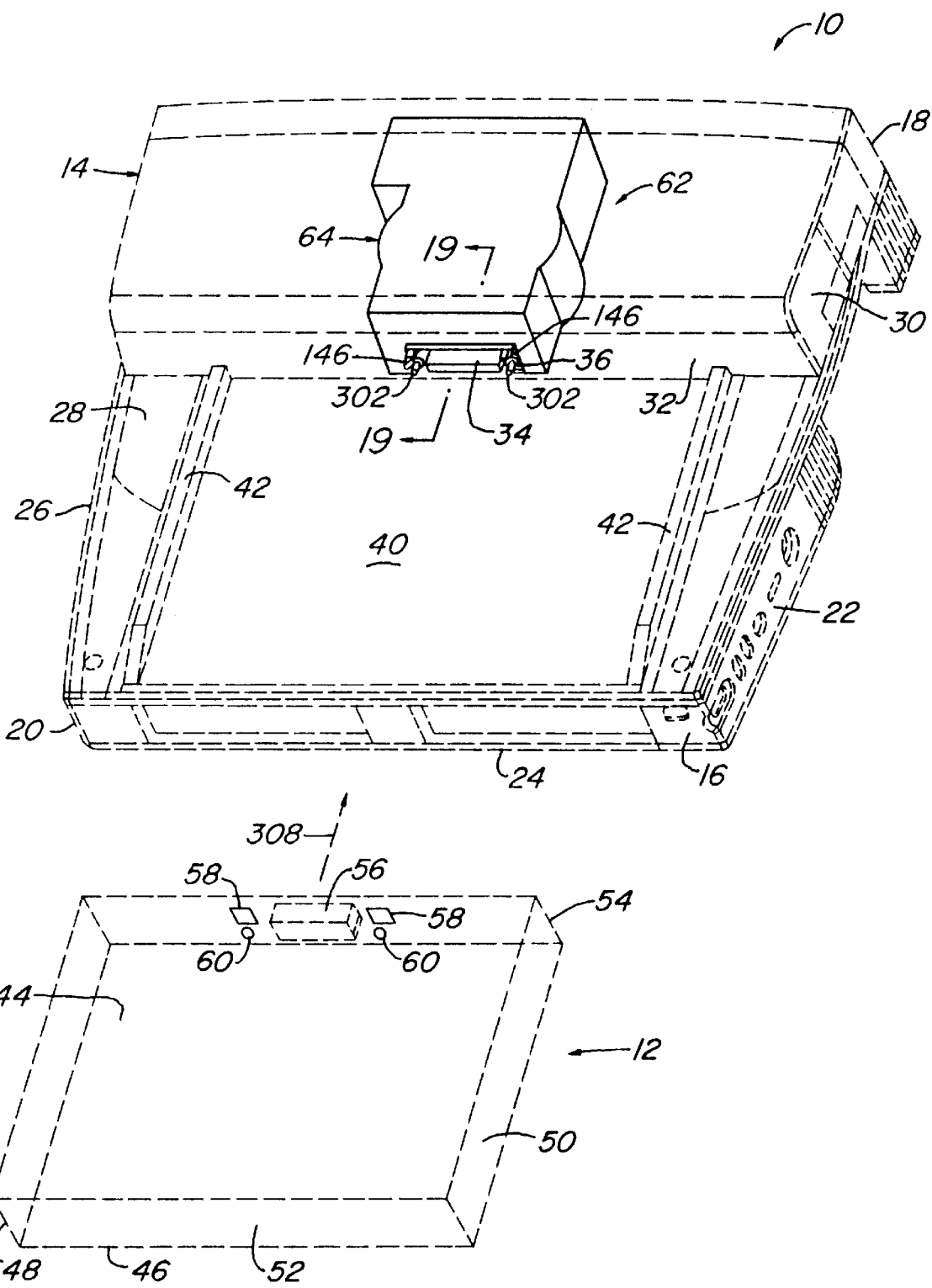
FIG. 1 is a simplified, partially phantomed perspective view of a docking station incorporating a modular motorized docking/undocking structure embodying principles of the present invention, and a representative portable computer operatively and removably connectable to the docking station.

Perspectively illustrated in FIG. 1 is a specially designed docking station 10 embodying principles of the present invention and operative to removably couple a portable computer, such as the notebook computer 12 schematically depicted in phantom in FIG. 1, to desktop computer peripheral devices (not shown) such as a keyboard, monitor, mouse and printer. Docking station 10 is designed to rest atop a horizontal support surface, such as a desk, adjacent such desktop computer peripheral devices and has a generally rectangular housing 14.

Housing 14 has front and rear vertical sides 16 and 18, left and right vertical sides 20 and 22, a bottom side 24, a front base section 26 having a top side 28, and a raised rear connection section 30 having a forwardly facing front side 32 projecting upwardly from the top side 28 and having a horizontally elongated electrical connector 34 projecting outwardly through a small rectangular opening 36 therein. Connector 34 is electrically coupled to appropriate interface circuitry disposed within the housing 14 (representatively including a vertically oriented printed circuit board 38 shown in FIG. 19) and coupled to the aforementioned desktop computer peripheral devices.

Extending along the top side 28 of the front housing base section 26 is a horizontal receiving area 40 flanked on opposite left and right sides thereof by upwardly projecting guide ribs 42 that are elongated in front-to-rear directions. As later described herein, the horizontal area 40 together with the ribs 42 serve to provide initial vertical and horizontal alignment between the computer 12 and the docking station connector 34 just prior to the actual docking process.

The notebook computer 12 has a generally rectangular configuration with top and bottom side walls 44 and 46, left and right side walls 48 and 50, and front and rear side walls 52 and 54. A horizontal electrical connector 56 is mounted on the rear side wall 54 of the computer 12 and is releasably mateable with the docking station connector 34 when the computer is operatively connected (i.e., "docked") to the docking station 10 as later described herein. Positioned at opposite ends of the connector 56 are two rectangular latch openings 58 formed in the rear computer side wall 54. Latch openings 58 are positioned above a pair of circular openings 60 also formed in the rear computer side wall 54 for reasons subsequently discussed herein.

Referring now to FIGS. 1–4, according to a key aspect of the present invention, a specially designed motorized docking/undocking module 62 is positioned within the rear connection section 30 of the docking station 10 and releasably latched to the front side thereof, in a manner subsequently described herein, over the rectangular opening 36 (see FIG. 1). Also as later described herein, the module 62 is used to automatically dock and undock the portable computer 12 to the docking station 10.

Structure of the Motorized Module 62

Figure 4:
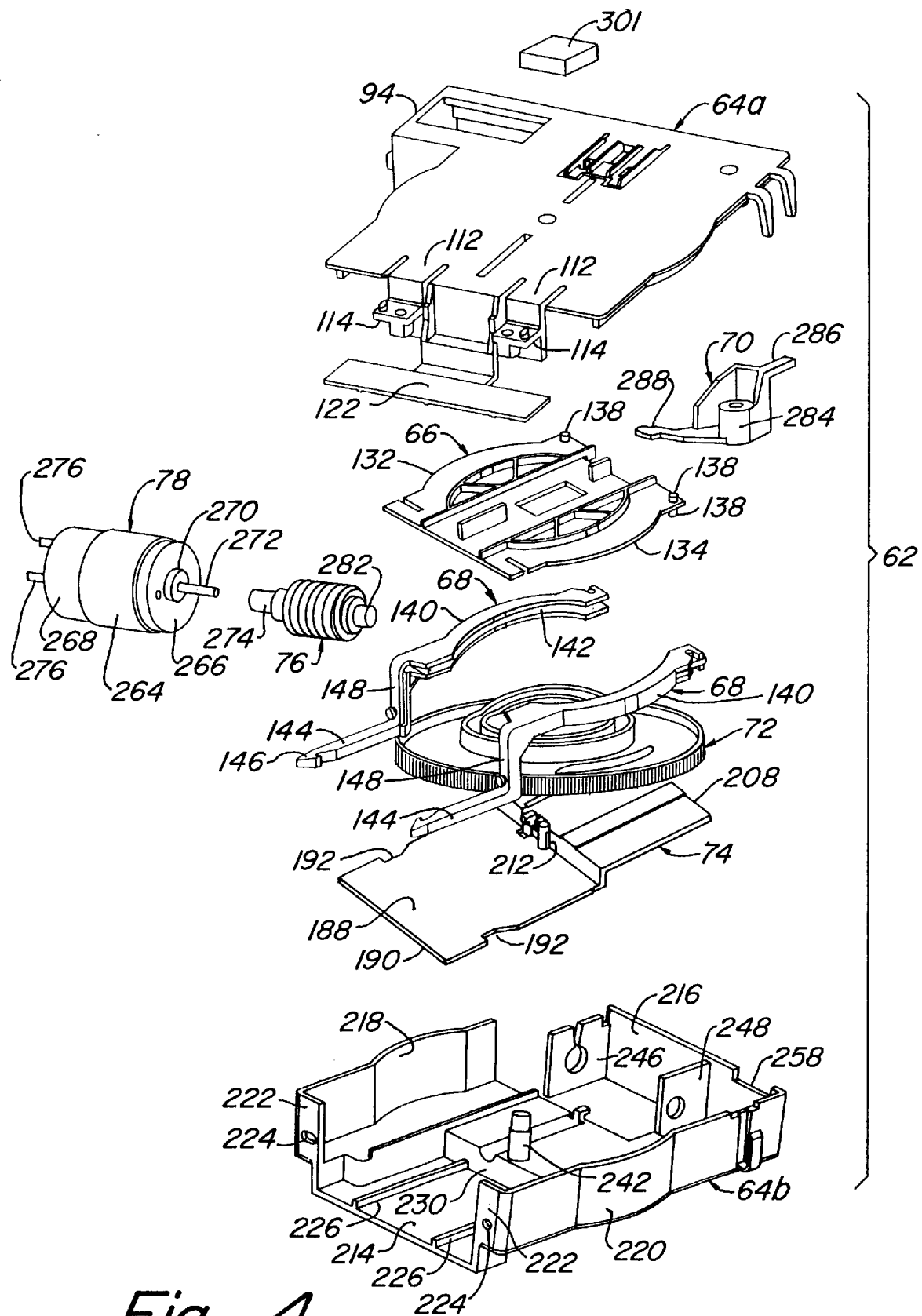
FIG. 4 is an enlarged scale exploded perspective view of the modular docking/undocking structure.

As perspectively illustrated in exploded form in FIG. 4, the motorized module 62 includes a top housing cover 64a that forms an upper portion of a support structure in the form of a housing 64; a latch arm sled structure 66; a pair of latch arm members 68; a manual ejection lever member 70; a cammed worm gear 72; an ejection plate member; a cylindrical drive worm 76; an open topped housing base portion 64b; and an electric drive motor 78. Module components 64–76 are representatively of a molded plastic construction. In the assembled module 62, the cover 64a is secured to the open top side of the base portion 64b with screws 80 to form a hollow module housing 64 (see FIGS. 2 and 3). The module components 66–78 are operably supported within the module housing 64 as generally shown in exploded form in FIG. 4 and as later described herein.

Figure 5:
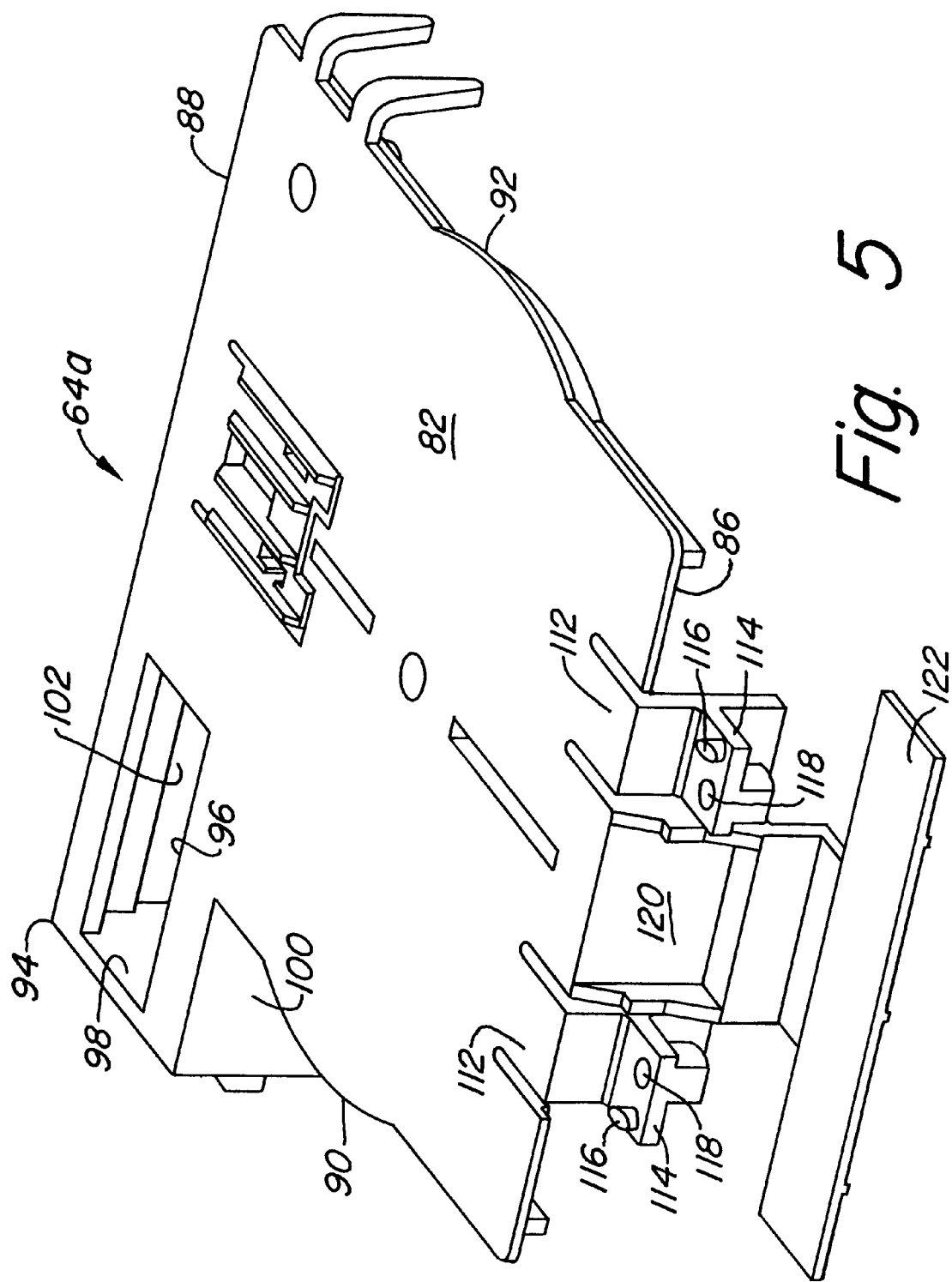
FIG. 5 is an enlarged scale top and front side perspective view of a top housing cover portion of the modular docking/undocking structure.
Figure 6:
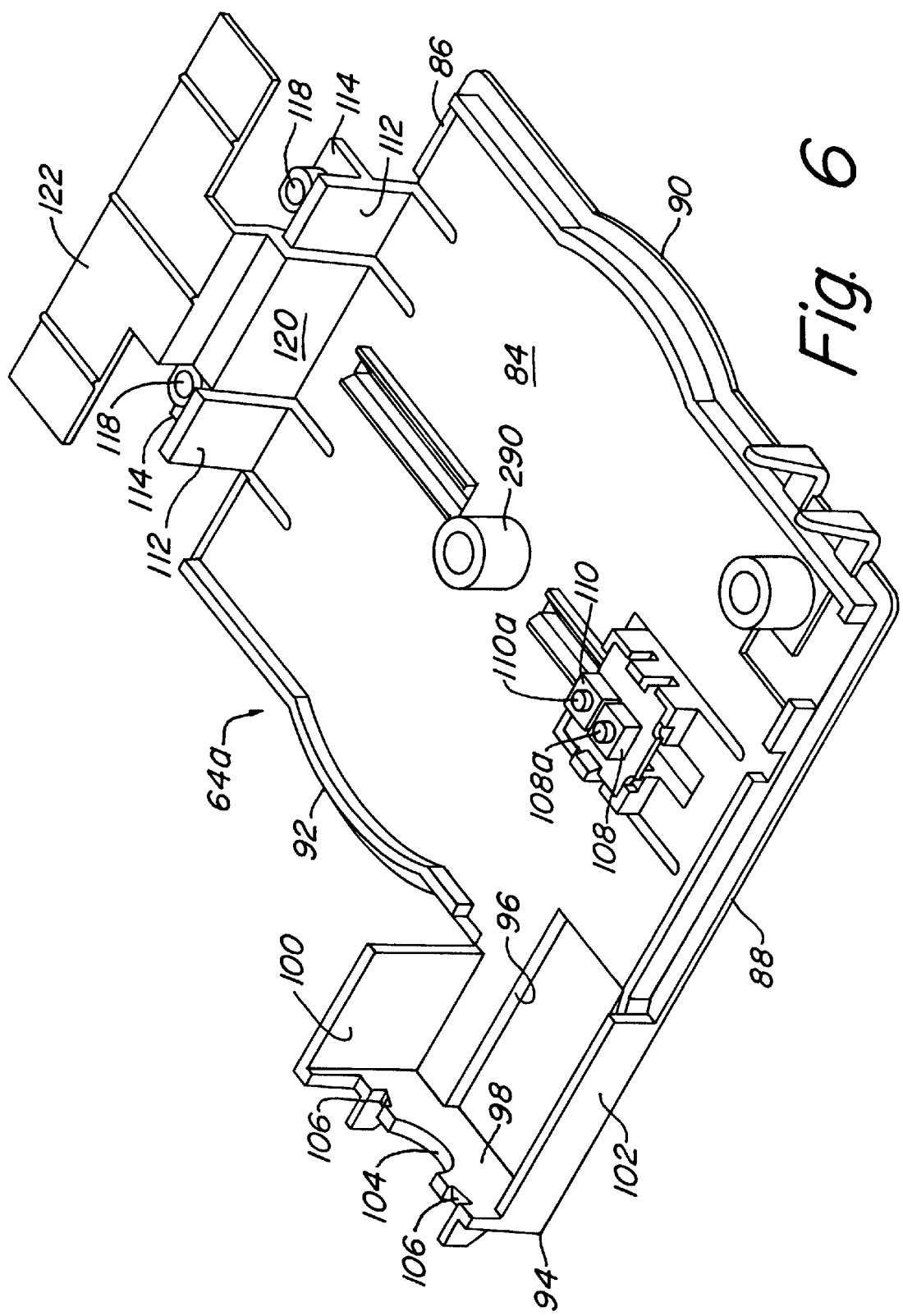
FIG. 6 is an enlarged scale bottom and rear side perspective view of the top housing cover portion.

Turning now to FIGS. 5 and 6, the top module housing cover 64a has a generally plate-shaped main portion with top and bottom sides 82 and 84, opposite front and rear side edges 86 and 88, and opposite left and right side edges 90 and 92. At the left rear corner of the top cover 64a is a horizontally outwardly projecting motor cover portion 94 having a rectangular cutout area 96 in its top side, a depending outer end wall 98, and depending front and rear side walls 100 and 102. As best illustrated in FIG. 6, the bottom edge of the wall 98 has a central arcuate depression 104 formed therein and positioned between a pair of notches 106 also formed in the bottom edge of the wall 98.

A pair of electrical position sensing switches 108,110 (see FIG. 6) are mounted on the underside of the housing cover 64a, adjacent its rear side edge 88, and respectively have depressible actuation buttons 108a,110a on their bottom sides. Spaced apart along the front side edge 86 of the housing cover 64a are a pair of latching tabs 112 that are resiliently deformable in a downward direction relative to the balance of the housing cover. Each latching tab 112 has a forwardly projecting portion 114 on the top side of which is an upwardly projecting cylindrical boss 116 and a mounting hole 118. Positioned between the two latching tabs 112 is a downwardly projecting support tab 120 at the lower end of which is a forwardly projecting, horizontally elongated rectangular security hood plate 122.

Figure 7:
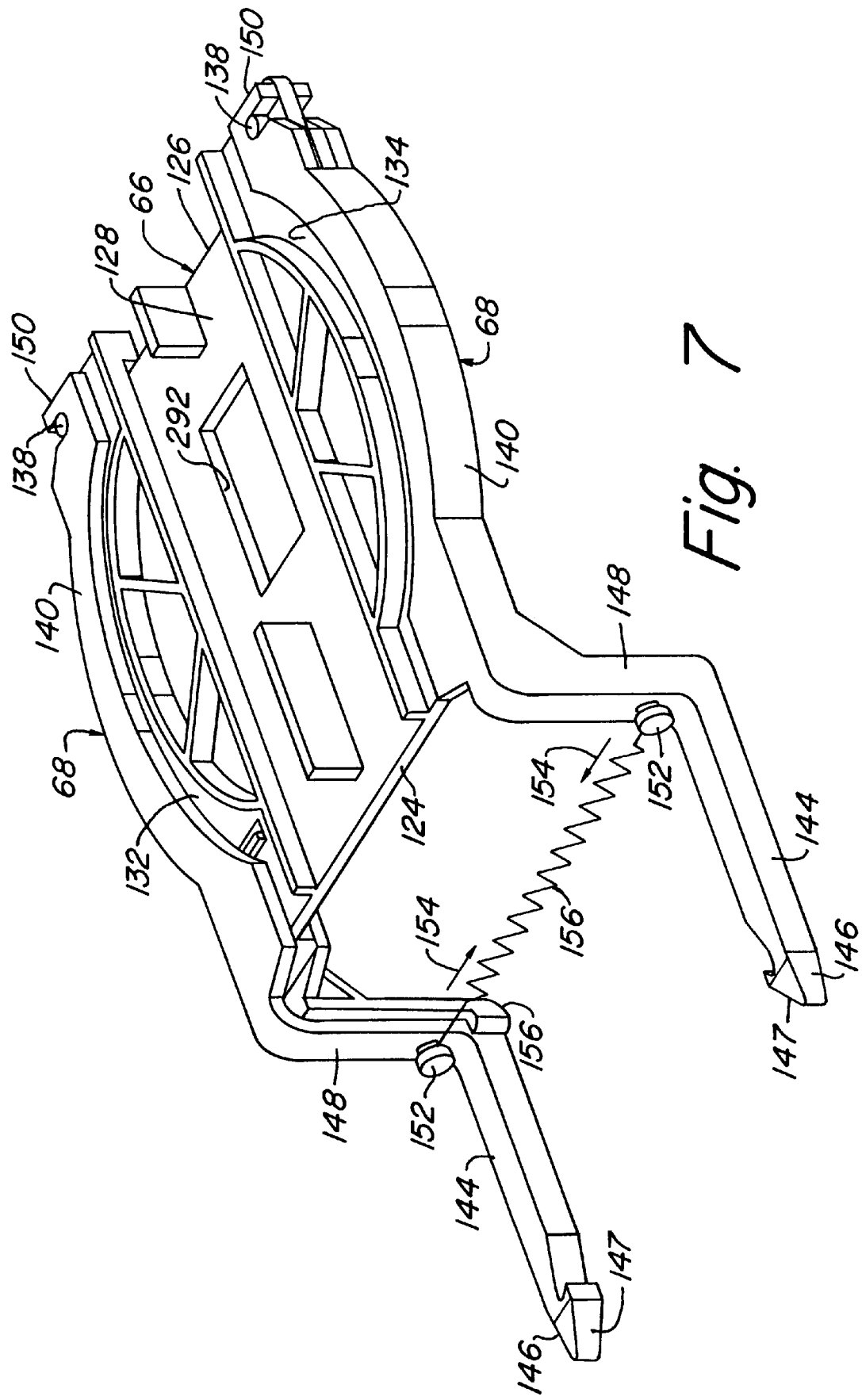
FIG. 7 is an enlarged scale, partially schematic front and top side perspective view of connected hook sled and arm portions of the modular docking/undocking structure.
Figure 8:
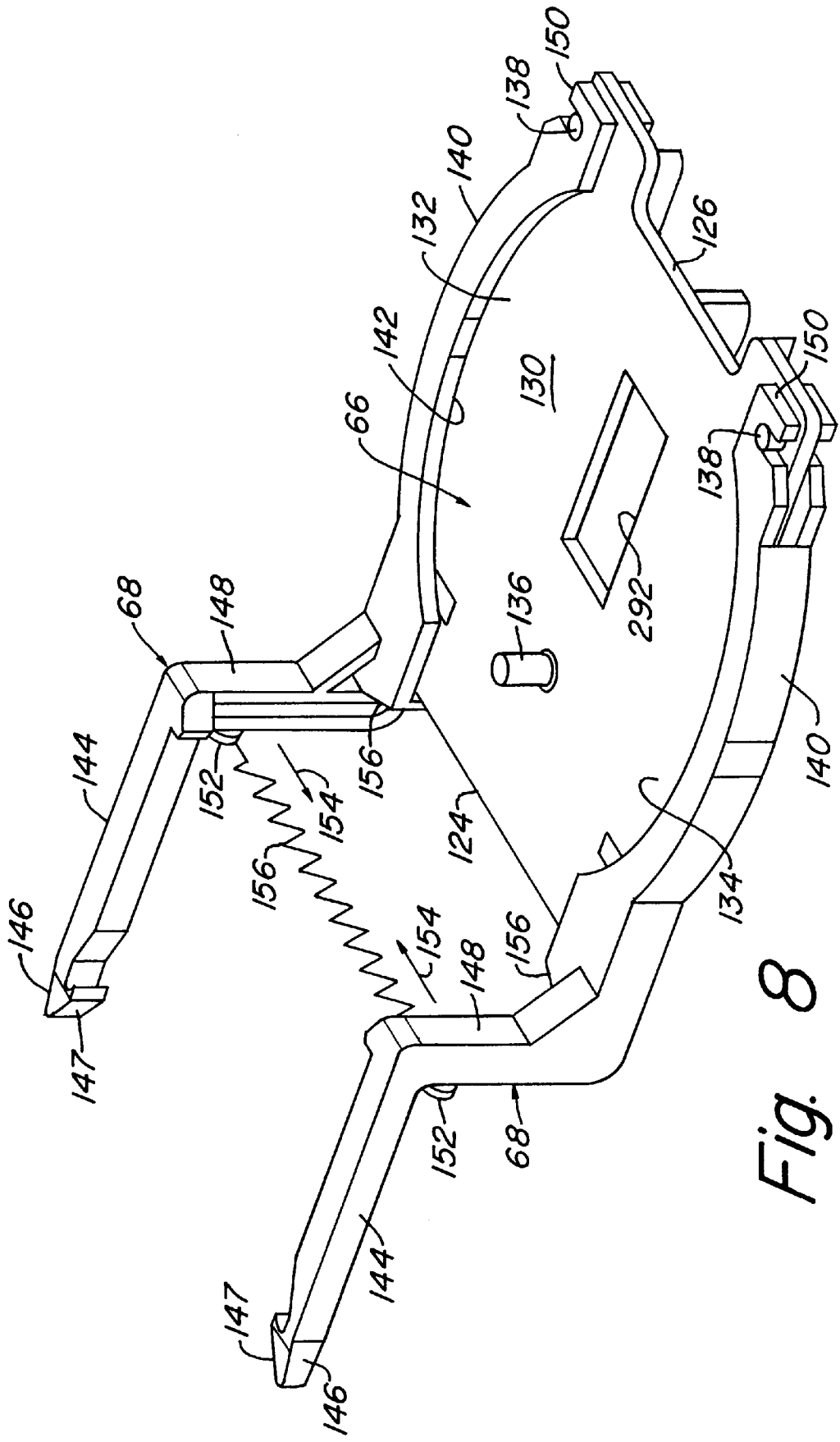
FIG. 8 is an enlarged scale, partially schematic rear and bottom side perspective view of the connected hook sled and arm portions.

With reference now to FIGS. 4, 7 and 8, the latch arm sled structure 66 has a generally plate-shaped configuration with front and rear side edges 124 and 126, opposite top and bottom sides 128 and 130, and partially arcuate opposite left and right side edge portions 132 and 134. A cylindrical drive pin 136 (see FIG. 8) projects downwardly from the bottom side 130 of the sled structure 66. At each rear corner of the sled structure 66 are a pair of upwardly and downwardly projecting mounting pins 138.

Each of the two latch arm members 68 has a partially arcuate horizontally extending rear longitudinal portion 140 with an inner side groove 142 extending along its length, a downwardly offset, horizontally extending front longitudinal portion 144 with a hooked outer end section 146 having a tapered inner side surface 147, and a transverse vertical intermediate portion 148 joining the rear and front portions 140 and 144.

The rear end 150 of each latch arm member 68 has a yoked configuration above and below its associated inner side groove 142, and a forwardly projecting connection post 152 is formed on the front side of the intermediate latch arm portion 148 vertically adjacent the front latch arm portion 144. As illustrated in FIGS. 7 and 8, the left and right side edge portions 132,134 of the sled structure 66 are slidably received in the latch arm inner side grooves 142, and the sled structure rear corner pins 138 are rotatably received in the latch arm yoke portions 150 to thereby permit the two latch arms 68 to horizontally pivot toward and away from one another about the sled structure corner pins 138.

The two latch arm members 68 are resiliently and pivotally biased toward one another, as indicated by the arrows 154 in FIGS. 7 and 8, by a schematically depicted coil spring member 156 connected at its opposite ends to the connection posts 152. For purposes later described, rearwardly and horizontally outwardly sloped cam surfaces 156 are formed on the inner sides of the two latch arm members 68 at the junctions of their rear and intermediate portion 140 and 148.

Figure 9:
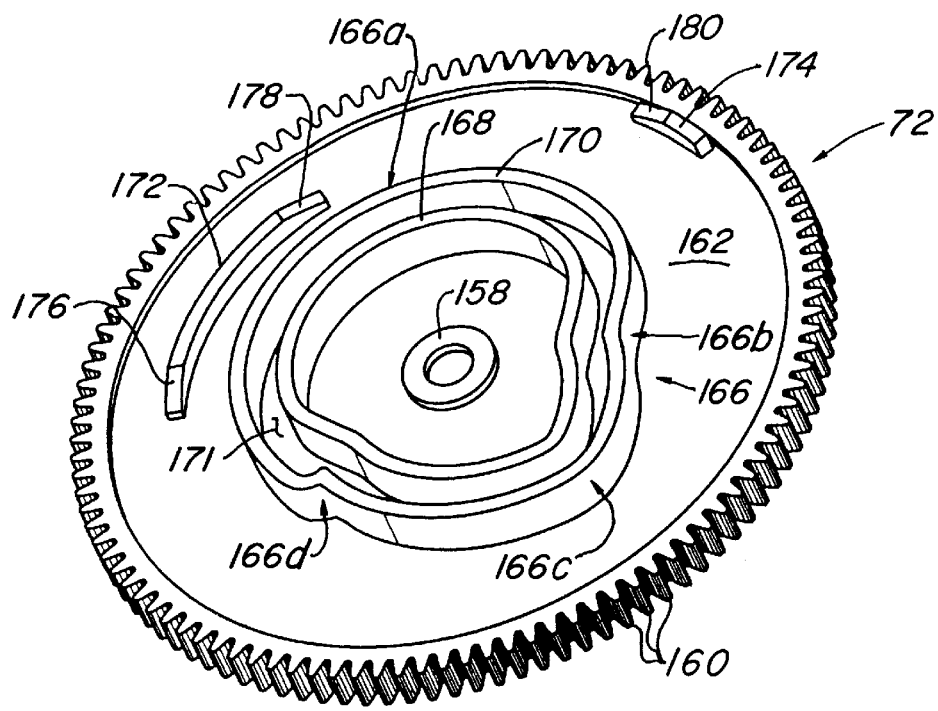
FIG. 9 is an enlarged scale top side perspective view of a cammed worm gear portion of the modular docking/undocking structure.
Figure 10:
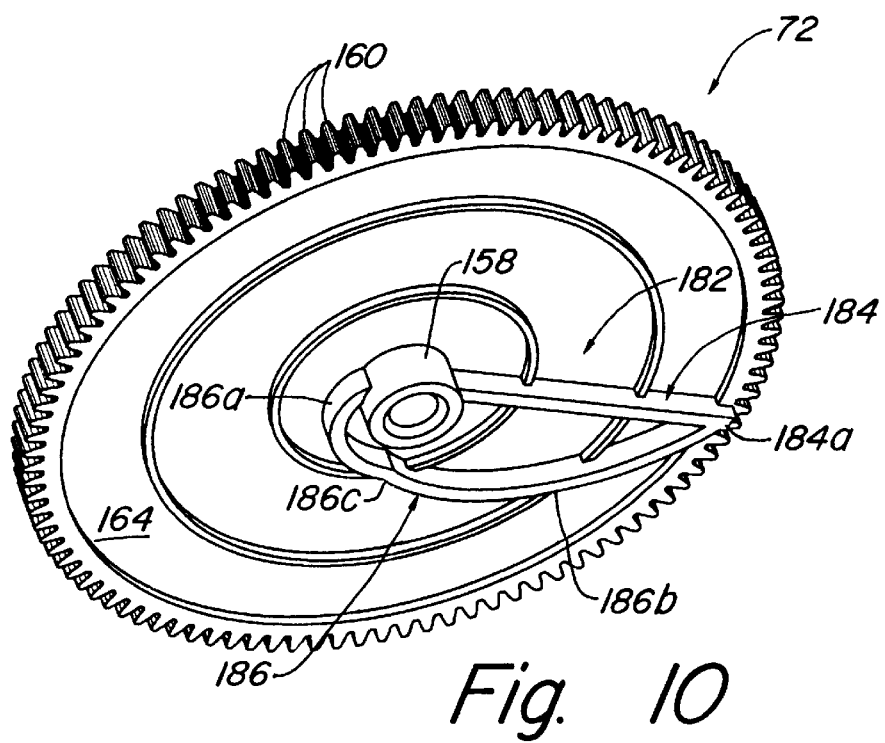
FIG. 10 is an enlarged scale bottom side perspective view of the cammed worm gear portion.

Turning now to FIGS. 9 and 10, the worm gear 72 has a central hollow cylindrical mounting hub 158, external gear teeth 160, and top and bottom sides 162 and 164. Formed on the top side 162 of the worm gear 72 is a top cam structure 166 (see FIG. 9) that outwardly encircles the hub 158 and has a pair of generally concentric inner and outer upstanding walls 168,170 that define therebetween a cam track 171. As illustrated in FIG. 9, the top cam structure 166 has, in a clockwise direction as viewed in FIG. 9, a circular section 166a that extends through an arc of approximately 180 degrees; a radially indented section 166b; a radially outwardly projecting section 166c; and a radially indented section 166d.

Also formed on the top side 162 of the worm gear 72 are arcuate, circumferentially extending inner and outer position sensing cams 172 and 174. Inner position sensing cam 172 is positioned radially outwardly of the cam section 166a and has tapered opposite end surfaces 176 and 178. Outer position sensing cam 174 is positioned radially outwardly from the cam section 166a, is circumferentially shorter than cam 172, is circumferentially offset therefrom in a clockwise direction as viewed in FIG. 9, has a tapered end portion 180, and is positioned further outwardly in a radial direction from the cam structure 166 than the cam 172.

A cam structure 182 (see FIG. 10) is formed on and projects downwardly from the bottom side 164 of the worm gear 72. This bottom cam structure includes a straight portion 184 extending radially outwardly from the hub 158 and terminating at an outer end 184a positioned just inwardly of the gear teeth 160, and an arcuate portion 186. Arcuate portion 186 has a relatively sharply curved radially inner section 186a disposed at the hub 158, a more gradually curved radially outer section 186b extending outwardly from the section 186a to the outer end 184a of the straight cam portion 184, and an indented section 186c disposed at the juncture of the sections 184a and 184b.

Figure 11:
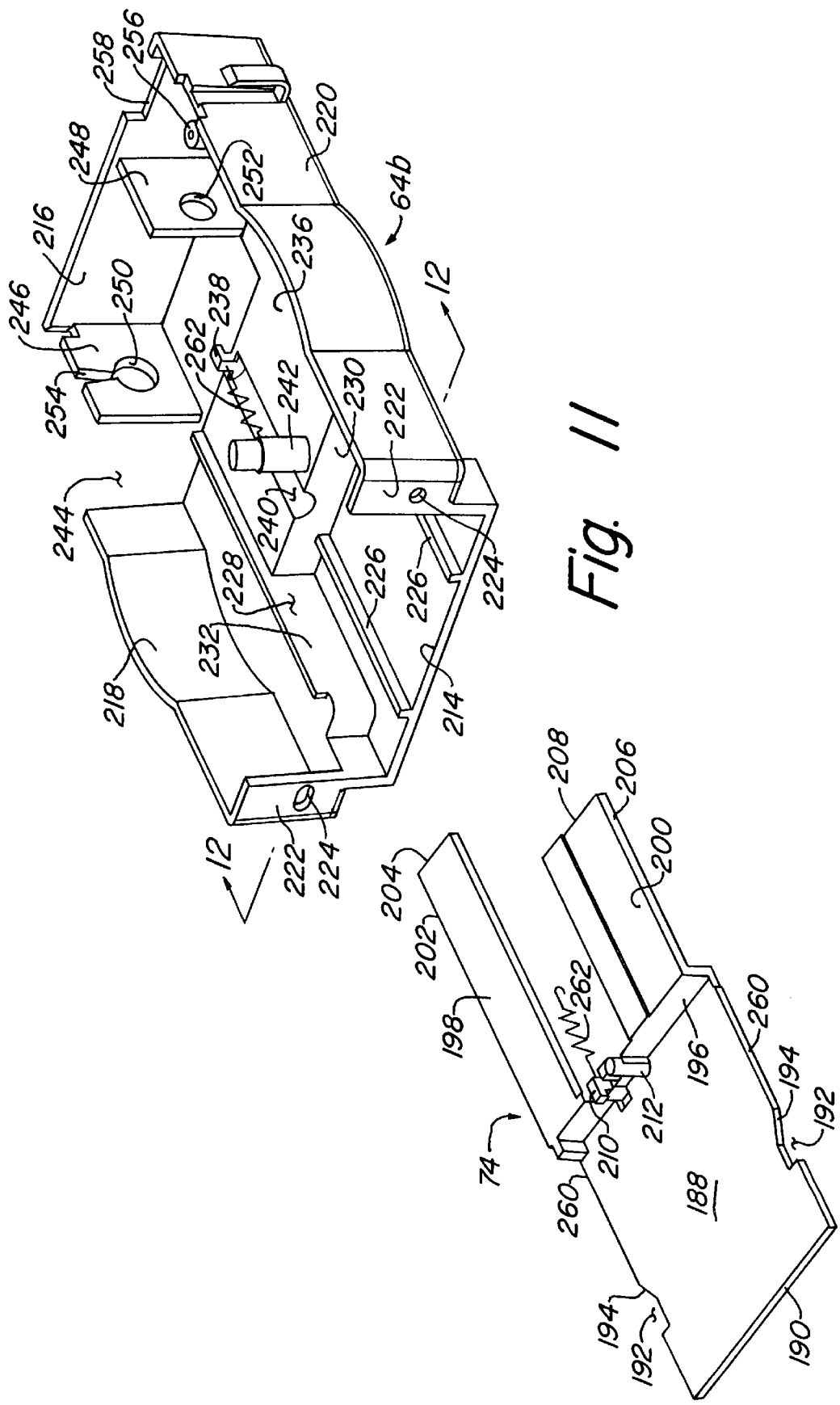
FIG. 11 is an enlarged scale, partially schematic exploded top and front side perspective view of housing base and ejector plate portions of the modular docking/undocking station.
Figure 12:
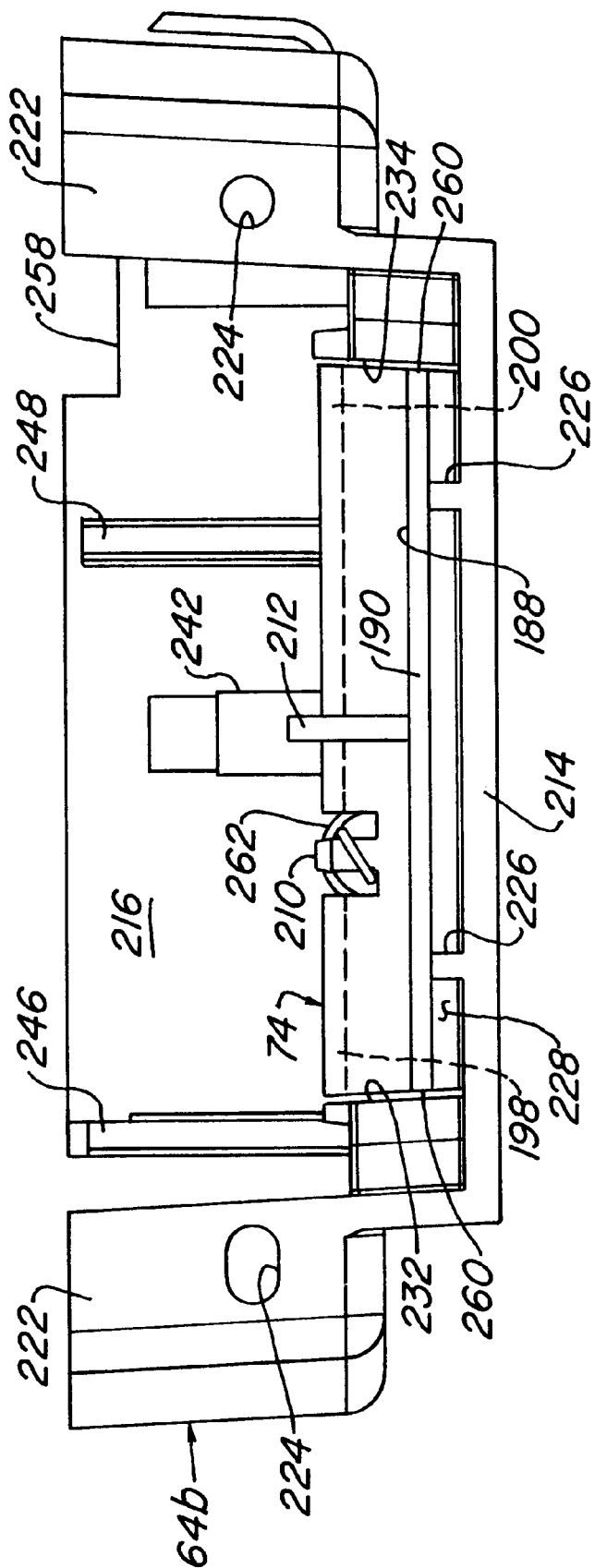
FIG. 12 is an enlarged scale front side elevational view of the housing base portion, with the ejector plate operatively disposed therein, taken along line 12—12 of FIG. 11.

With reference now to FIGS. 4, 11 and 12, the ejection plate member 74 has an elongated rectangular base plate section 188 with a front end edge 190 and a pair of opposite side edge recesses 192 having rearwardly and horizontally outwardly sloped cam surfaces 194 thereon. At the rear end of the base plate section 188 is an upturned intermediate wall 196 from the top side edge of which a spaced pair of left and right upper wall portions 198 and 200 rearwardly extend.

Upper wall portion 198 has an outer side edge 202 and a rear end edge 204, and upper wall portion 200 has an outer side edge 206 and a rear end edge 208 which is forwardly offset relative to the rear end edge 204 of the upper wall portion 198. Projecting upwardly from a rear edge portion of the base plate section 188, and positioned horizontally between the front ends of the left and right upper wall portions 198 and 200, are a spring connection tab 210 and a drive pin 212.

Still referring to FIGS. 4, 11 and 12, housing base 64b is of an open-topped, generally rectangular configuration and has a bottom wall 214, a rear end wall 216, and opposite left and right side walls 218 and 220. The front end of the housing base 64 is also essentially open and has left and right wall sections 222 with guide holes 224 extending therethrough. A spaced pair of upwardly projecting support ribs 226 longitudinally extend rearwardly along the top side of the bottom wall 214 within a rectangular depression 228 in a front interior portion of the housing base 64b.

Depression 228 is bounded along its inner end by a rear interior vertical wall surface 230, and on its opposite sides by left and right interior vertical wall surfaces 232 and 234. Vertical wall surface 230 is disposed at the juncture of the bottom wall 214 and a somewhat higher horizontal interior wall 236 generally centrally disposed between the front and rear ends of the housing base 64b. A spring connection tab 238 projects upwardly from the wall 236 at the rear end of an arcuately cross-sectioned depression 240 formed in the top side of the wall 236. Just to the right of the depression 240 a cylindrical mounting post 242 projects upwardly from the horizontal interior wall 236 adjacent its front edge.

As viewed in FIG. 11, the housing base 64b has an open left rear corner portion 244. To the right of the open corner portion 244 are two horizontally spaced apart vertical support walls 246 and 248. Support walls 246 and 248 respectively have central circular openings 250 and 252, and the top side edge of the support wall 246 has a slot 254 extending downwardly therethrough into the central opening 250. An upwardly projecting cylindrical mounting post 256 is positioned in a right rear interior corner portion of the housing base 64b in a forwardly spaced apart relationship with a rectangular notch 258 formed in the top side edge of the rear end wall 216.

The ejection plate member 74 is operatively received in the housing base 64b, for sliding forward and rearward movement relative thereto, with the base plate section 188 resting atop the ribs 226, and the opposite side edges 260 of the base plate section 188 slidably positioned against the vertical interior side wall surfaces 232 and 234 of the housing base 64b. A schematically depicted coil spring member 262 is connected at its opposite ends to the spring connection tabs 210 and 238, and functions to resiliently bias the ejection plate member 74 rearwardly into the interior of the housing base 64b to an undeflected position in which the vertical intermediate wall 196 of the ejection plate member 74 rearwardly abuts the interior wall surface 230 within the housing base. In this position a front end portion of the base plate section 188 projects forwardly beyond the front end of the housing base 64a.

The electric drive motor 78 (see FIGS. 4 and 17) has a cylindrical body portion 264 having inner and outer ends 266 and 268, a cylindrical boss 270 on its inner end 266, a drive shaft 272 axially extending outwardly from the boss 270 and coaxially anchored to a reduced diameter outer end portion 274 of the drive worm 76, and a diametrically opposite pair of axially outwardly projecting electrical connection tabs 276 disposed on the outer motor body end 268 and inserted into attachment sleeves 278 of electrical power wires 280 (see FIGS. 17 and 18). As illustrated in FIGS. 4 and 17, the drive worm 76 has a reduced diameter cylindrical boss 282 on its right or inner end.

As best illustrated in FIGS. 4 and 17, the manual ejection lever member 70 has a hollow cylindrical mounting boss 284, a rearwardly projecting tab 286, and a leftwardly projecting tab 288. The lever member 70 is installed within the housing base 64b with the housing base mounting post 256 rotatably received in the cylindrical boss 284 of the lever member 70 (see FIG. 17), the lever member tab 286 rearwardly extending outwardly through the upper side edge notch 258 in the rear housing base wall 216, and the front side of the ejection lever tab 288 engaging the rear end edge 208 of the right upper wall portion 200 of the ejection plate member 74.

Figure 14A:
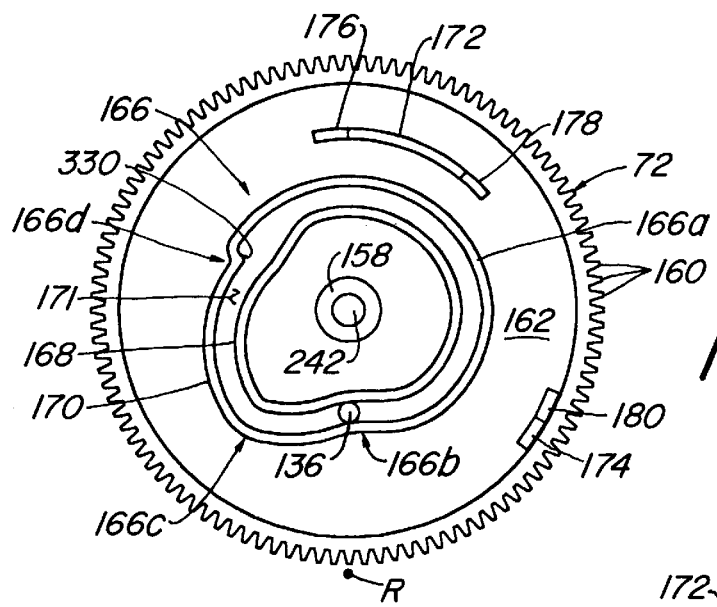
FIGS. 14A–14F are top plan views of the cammed worm gear sequentially illustrating its operation during the computer docking and undocking sequences.
Figure 15A:
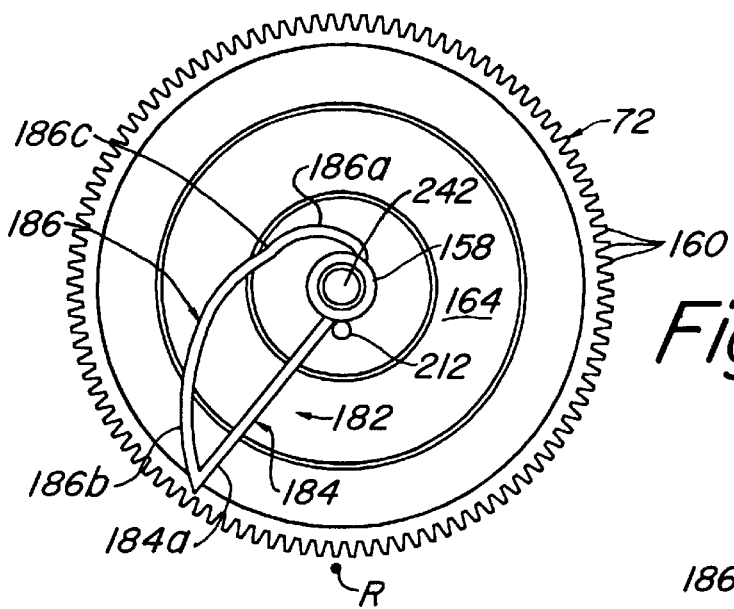
FIGS. 15A–15F are bottom plan views of the cammed worm gear respectively corresponding to FIGS. 14A–14F.

With the ejection plate member 74 and the manual ejection lever member 70 installed within the housing base 64b as described above, the assembly of the motorized docking/undocking module 62 is completed by next placing the cammed worm gear 72, bottom side 164 down, atop the installed ejection plate member 74 in a manner such that the base housing mounting post 242 rotatably extends upwardly through the worm gear mounting hub 158 (see FIGS. 9, 11 and 14A), and the ejection plate member drive pin 212 is positioned circumferentially outside the straight and arcuate portions 184,186 of the bottom worm gear cam structure 182 (see FIG. 15A).

Figure 16A:
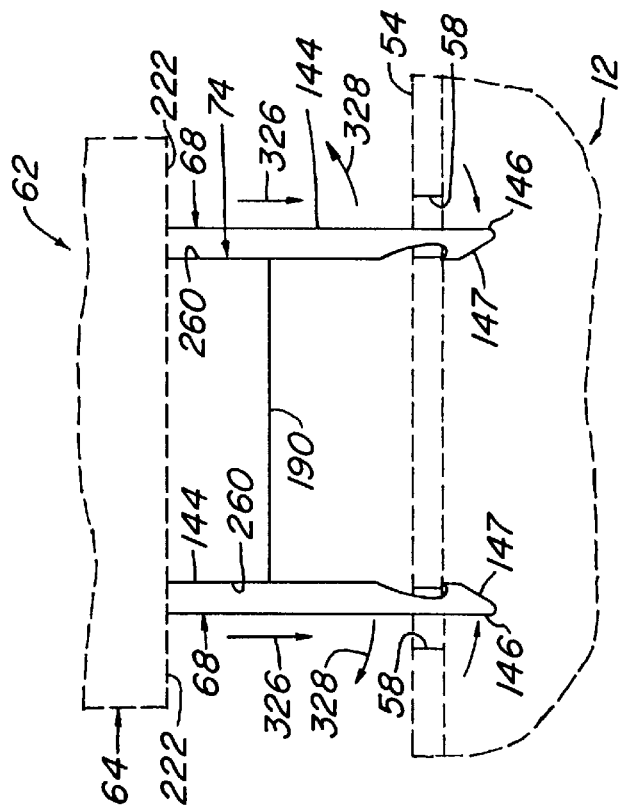

Next, the sled structure 66 (with the latch arms 68 attached thereto as depicted in FIGS. 7 and 8) is positioned, bottom side 130 down) atop the worm gear 72 with the sled structure drive pin 136 downwardly and slidably received in the upper worm gear cam track 171 (see FIG. 14A), and the front latch arm portions 144 horizontally straddling the ejection plate member base plate section 188, and slidably engaging its opposite left and right side edges 260, as illustrated in FIG. 16A.

The electric drive motor 78, with the drive worm 76 coaxially anchored to its drive shaft 272, is then installed in the module 62 by vertically tilting the drive shaft 272 so that the drive worm 76 is positioned lower than the motor body 262, rightwardly inserting the drive worm boss 282 into the base housing interior wall opening 252 (see FIGS. 11 and 17), downwardly pivoting the drive shaft 272 to cause it to downwardly enter the interior wall slot 254, and then moving the motor body 264 rightwardly to cause the motor body cylindrical boss 270 to rightwardly enter the interior wall opening 250. During this process, the teeth on the drive worm are appropriately mated with the teeth 160 on its associated worm gear 72 (see FIG. 17).

With the drive motor 78 positioned in this manner, the motor body 264 is disposed within the open left rear corner portion 244 of the housing base 64b (see FIG. 11). The housing cover 64a (see FIGS. 2–6) is then secured to the housing base 64b over its open top side. With the housing cover 64a thus secured, a hollow cylindrical boss 290 (see FIG. 6) formed on the bottom side 84 of the housing cover 64a extends downwardly through a rectangular opening 292 in the sled structure 66 (see FIGS. 7 and 8) and receives an upper end portion of the housing base mounting post 242 (see FIG. 11). The boss 290 permits the sled structure 66 to move forwardly and rearwardly relative to the module housing 64, but serves as a stop for the opposite side edges of the opening 292 to restrain rightward and leftward horizontal movement of the sled structure 66 relative to the module housing 64.

According to a feature of the present invention, various wall portions of the module housing 64 cooperate with the installed drive motor 78 in a manner such that it is operatively held in place, with its body 264 restrained against appreciable rotational and translational movement relative to the module housing 64, without the use of any separate fasteners (such as mounting screws) of any sort.

Specifically, with reference to FIGS. 17 and 18, it can be seen that the interior housing base wall 246 and the housing cover wall 98 respectively abut the inner and outer ends 266,268 of the motor body 264 to thereby substantially preclude its axial movement relative to the module housing 64. The interior housing base wall 246, via its engagement of the motor body boss 270, substantially precludes lateral translational movement of the motor body 264 relative to the module housing 64. Moreover, the respective engagement of the bosses 270,282 with the spaced apart interior housing base walls 246,248 precludes appreciable pivotal movement of the motor body 264 relative to the module housing 64 about an axis transverse to the drive shaft 272.

Finally, as illustrated in FIGS. 17 and 18, the electrical connection tabs 276 on the motor body 264 are upwardly received in the notches 106 in the lower side edge of the housing cover wall 98. This restrains the motor body 264 against appreciable pivotal movement relative to the module housing 64 about the axis of the drive shaft 272. Specifically, as viewed in FIG. 18 a clockwise torque on the motor body 264 is resisted by the engagement of the left connection tab 276 with the upper end surface of the left wall notch 106, while a counterclockwise torque on the motor body 264 is resisted by the engagement of the right connection tab 276 with the upper end surface of the right wall notch 106.

Figure 2:
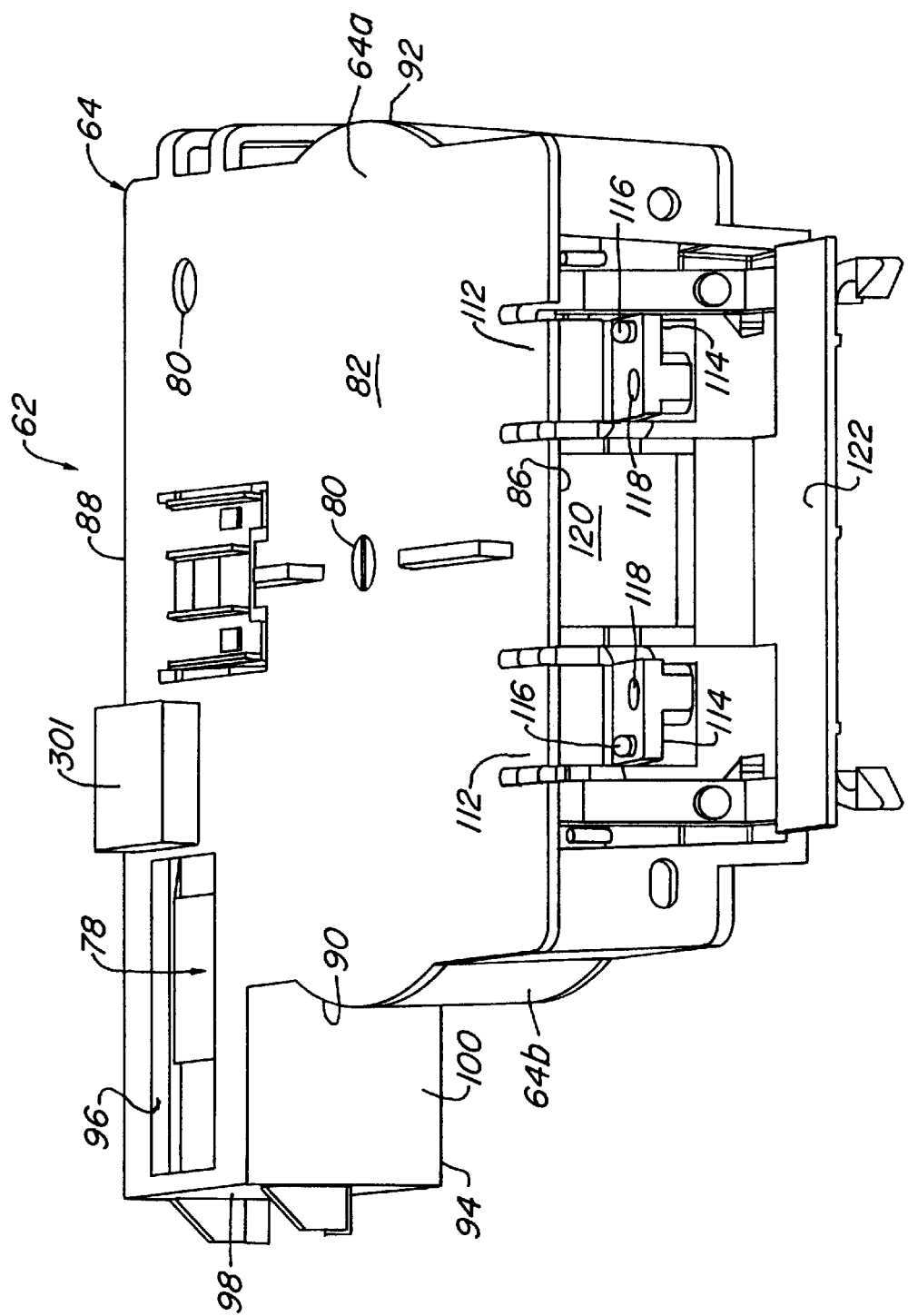
FIG. 2 is an enlarged scale top and front side perspective view of the modular docking/undocking structure.
Figure 3:
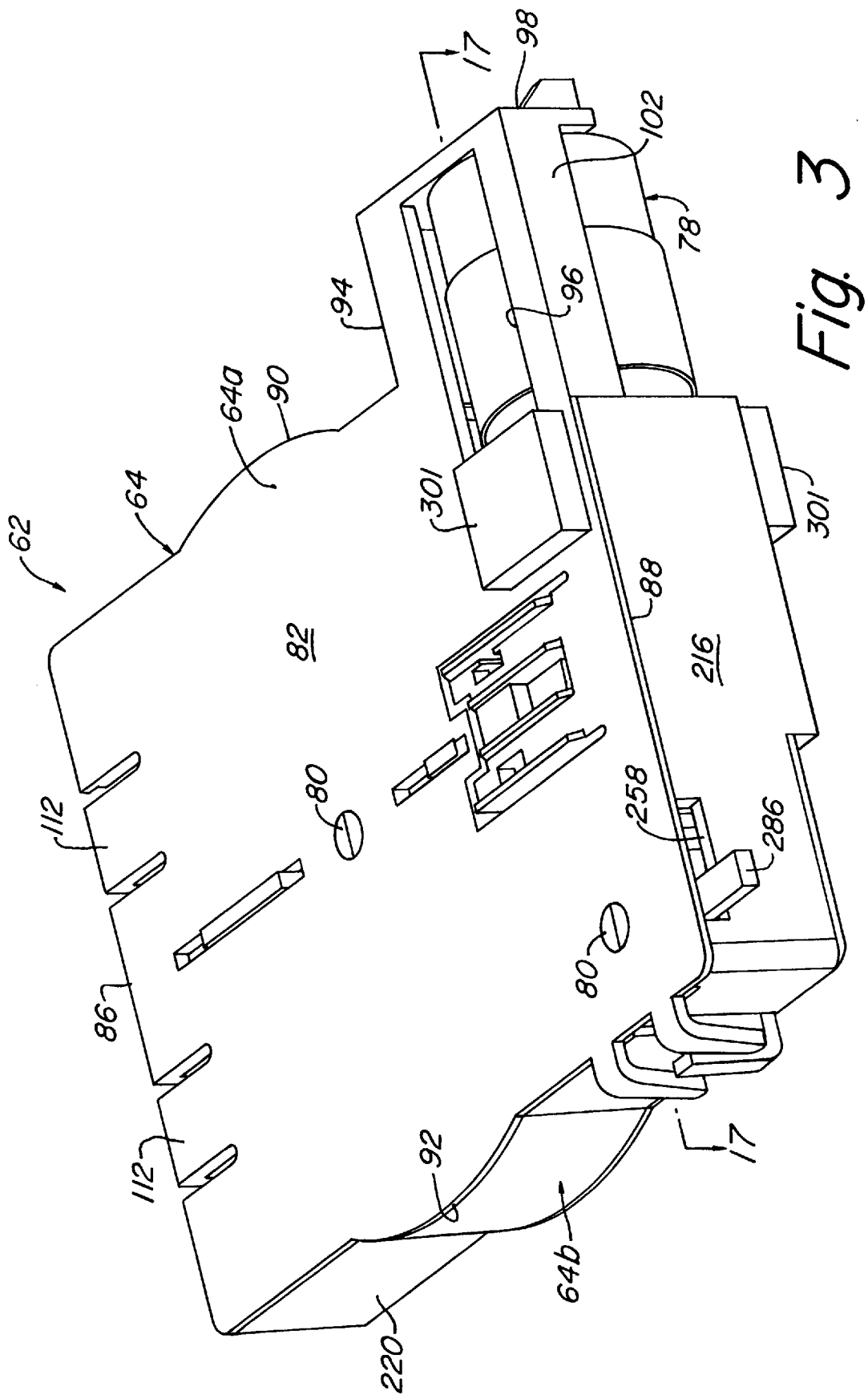
FIG. 3 is an enlarged scale top and rear side perspective view of the modular docking/undocking structure.

Turning now to FIGS. 1, 2 and 19, within the interior of the connection section 30 of the docking station 10 a vertical metal plate 294 (see FIG. 19) is sandwiched between the front side 32 of the housing section 30 and the circuit board 38 and has a pair of rearwardly projecting horizontally spaced apart alignment pins 296 that extend through and rearwardly beyond the circuit board 38, and a transverse, rearwardly projecting upper side section 294a having a horizontally spaced pair of holes 298 therein. The assembled module 62 may be quickly and easily installed within the interior of the connection section 30 of the docking station 10, with the rear side 18 thereof removed, by simply depressing the module housing tabs 112 (see FIG. 2) and positioning the forwardly projecting portions 114 thereof beneath the rearwardly projecting transverse upper side portion 294a of the metal plate 294 as the alignment pins 296 are caused to enter the guide holes 224 in the front wall portions 222 (see FIG. 11) of the housing base 64b.

When the cylindrical bosses 116 on the latching tab portions 114 are brought into underlying alignment with the metal plate holes 298, the latching tabs 112 are released to permit the bosses 116 to pop up into the plate holes 298, thereby releasably latching the module 62 to the docking station housing. A pair of screws 300 (only one which is visible in FIG. 19) are then inserted downwardly through corresponding holes in the upper metal plate portion 294a (not shown) and threaded into the housing cover tab holes 118 (see FIG. 5) to complete the mounting of the module 62 on the docking station housing. Resilient rectangular cushioning blocks 301 (see FIGS. 2 and 3) are suitably secured to rear top and bottom side portions of the module housing 64. When the module 64 is mounted within the docking station housing, these blocks contact and are somewhat deformed by interior structure within the housing, and serve as vibration isolation structures for the mounted motorized module 62. This vibration isolation is positioned closely adjacent the motor 78 (a potential source of vibration in the module), while the module is hard-mounted to the docking station a considerable distance away from the module motor.

With the module 62 removably mounted on the docking station housing in this manner, the front latch arm portions 144, and the security hood plate 122 that overlies them as shown in FIG. 19 (see also FIG. 1) projects outwardly through the docking station housing opening 36 above the docking station connector 34. To facilitate the docking of the portable computer 12 as subsequently described herein, a pair of guide pins 302 are suitably supported on the docking station housing and project forwardly beyond opposite horizontal ends of the docking station connector 34.

Operation of the Motorized Module 62

Figure 13:
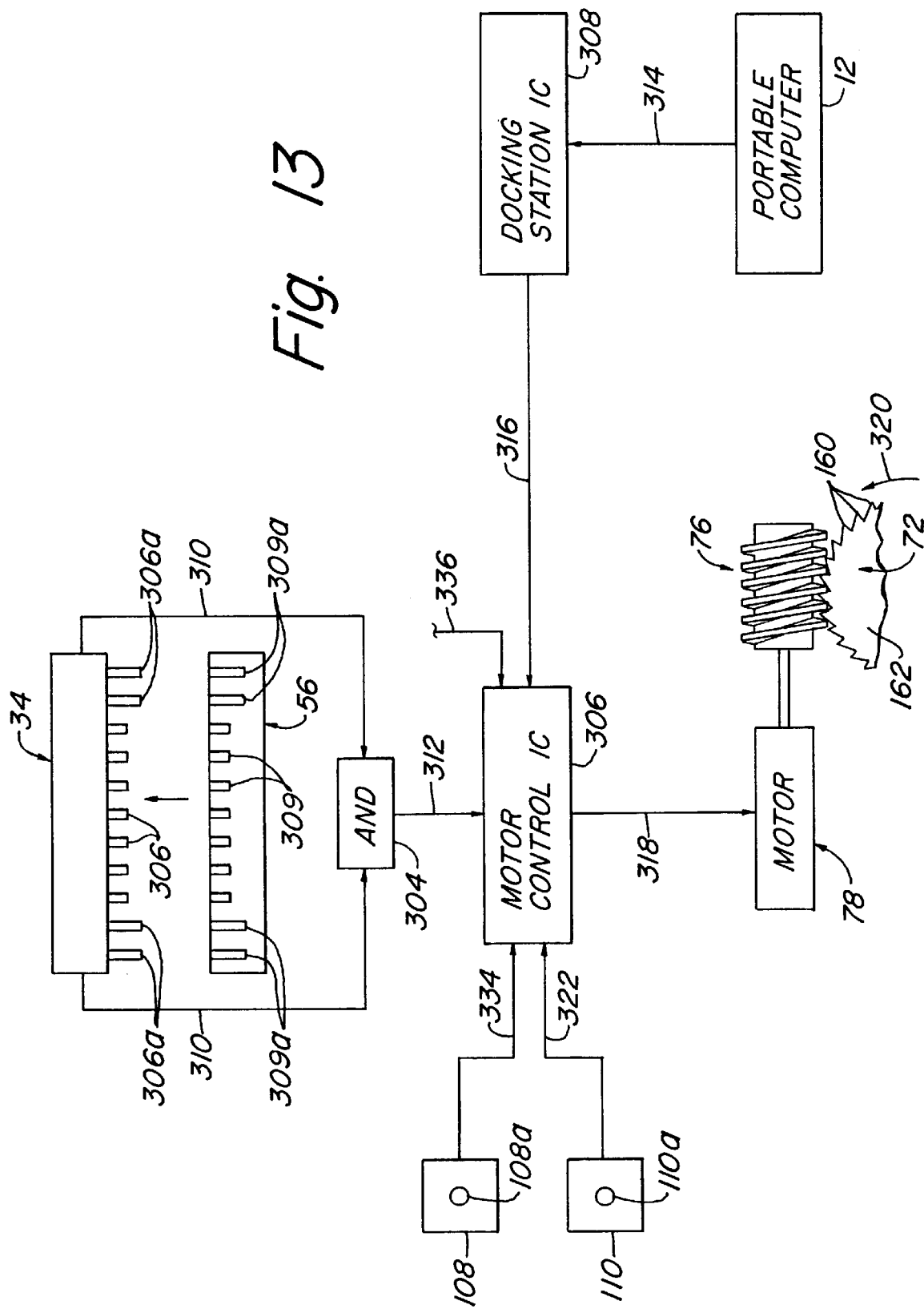
FIG. 13 is a highly schematic diagram of a portion of the control system used to operate the modular docking/undocking structure.

The operation of the motorized docking/undocking module 62 will now be described. Referring first to FIG. 13, the docking and undocking operations are controlled by a schematically depicted circuit that is operatively associated with the motor 78 and the docking station connector 34 and comprises the aforementioned position sensing switches 108 and 110 (see FIG. 6) on the underside of the housing cover 64a, an AND gate 304, a motor control IC (integrated circuit) 306, and a docking station IC 308.

For purposes later described, and as schematically shown in FIG. 13, the docking station connector 34 has a series of forwardly projecting connector pins 306 including opposite end pins 306a which are considerably longer than the rest of the pins 306. Corresponding sockets 309, including longer opposite end sockets 309a, are disposed in the computer connector 56 for removable receipt of the docking station connector pins 306,306a.

To begin the mechanized docking operation, the portable computer 12 (see FIG. 1) is placed bottom side 46 down on the horizontal receiving area 40 of the docking station housing 14, with the opposite left and right sides 48,50 of the computer slidingly engaging the ribs 42 and the computer connector 56 being forwardly spaced apart from and facing the docking station connector 34. This initial placement of the computer 12 on the docking station 10 provides a corresponding initial horizontal and vertical alignment between the docking station and computer connectors 34 and 56. Alternatively, depending on the design of the computer 12, the horizontal alignment between the two connectors may be achieved using only one of the two ribs 42 and one of the left and right sides 48,50 of the computer.

Next, as indicated by the arrow 308 in FIG. 1, the computer 12 is manually slid rearwardly along the docking station receiving area 40 until the docking station guide pins 302 enter the corresponding guide pin openings 60 in the rear wall 54 of the computer, and the long pins 306a on the opposite ends of the docking station connector 34 (see FIG. 13) touch their corresponding elongated opposite end sockets 309a on the rearwardly moving computer 12.

If elongated pin and socket contact is made on both ends of the now adjacent docking station and computer connectors 34 and 56, a pair of corresponding initial contact electric signals 310 are automatically transmitted to the AND gate 304 which responsively outputs an electrical signal 312 to the motor control IC 306. At the same time, conventional circuitry within the portable computer 12 outputs to the docking station IC 308 an electrical signal 314 indicative of the presence of the computer. Upon receiving the signal 314 the docking station IC 308 responsively transmits to the motor control IC 306 an electrical signal 316. If the computer is in the "on" state when the above-described elongated pin and socket contact is made, a signal (not illustrated) is sent to the computer to prepare itself for docking by shutting down its operations, such as disk operations and the like, until docking is feasible.

Upon receiving both of the signals 312 and 316 the motor control IC transmits to the motor 78 a drive signal 318 that energizes the motor 78 in a manner causing the drive worm 76 to rotate the cammed worm gear 72 in a counterclockwise direction (as viewed from the top side of the worm gear 72) as indicated by the arrow 320. If either of the two signals 312,316 is not received by the motor control IC 306, its output signal 318 is not generated, and counterclockwise rotation of the worm gear 72 is not initiated. For example, if only one of the elongated end pin sets 306a on the docking station connector 34 contacts their corresponding computer connector sockets 309a (a situation indicating initial manual misalignment between the two connectors), the signal 312 is not generated and worm gear rotation does not start.

The sequential positions of the cammed worm gear 72 (viewed from its top and bottom sides), the latch arms 68, the ejection plate member 74, and the computer relative to the module 62 are shown in FIGS. 14A–14F, 15A–15F, and 16A–16F, with the front side of the module 62 facing the bottom of the sheet in all of these drawing figures. To facilitate a comparison of the various relative worm gear rotational positions during docking and undocking of the computer 12, a reference point "R" has been indicated on a fixed circumferential location on the worm gear 72.

Just prior to the generation of the initial motor drive signal 318 by the motor control IC 306 (see FIG. 13), the worm gear 72 is in its "home undocked" rotational position, indicated in FIGS. 14A and 15A, in which the cam track portion 166b is facing forwardly relative to the module housing 64 and the sled structure drive pin 136 is positioned in the cam track portion 166b. As illustrated in FIG. 16A, the hooked outer ends 146 of the latch arm members 68 are positioned rearwardly of the latch openings 58 in the rear wall 54 of the computer 12, and the outer end edge 190 of the ejection plate member 74 is positioned rearwardly of the hooked outer latch member ends 146.

Additionally, a left end portion of the inner position sensing cam 172 (see FIG. 14A) underlies and upwardly depresses the button 110a of the position sensing switch 110 (see FIG. 6), causing the switch 110 to transmit an electrical output signal 322 to the motor control IC 306 (see FIG. 13) which serves to terminate the motor drive signal 318 at the end of a previous undocking cycle. At this time the outer position sensing cam 174 (FIG. 14A) does not engage the button 108a of its corresponding position sensing switch 108 which accordingly is not transmitting a similar output signal to the motor control IC 306.

Figure 14B:
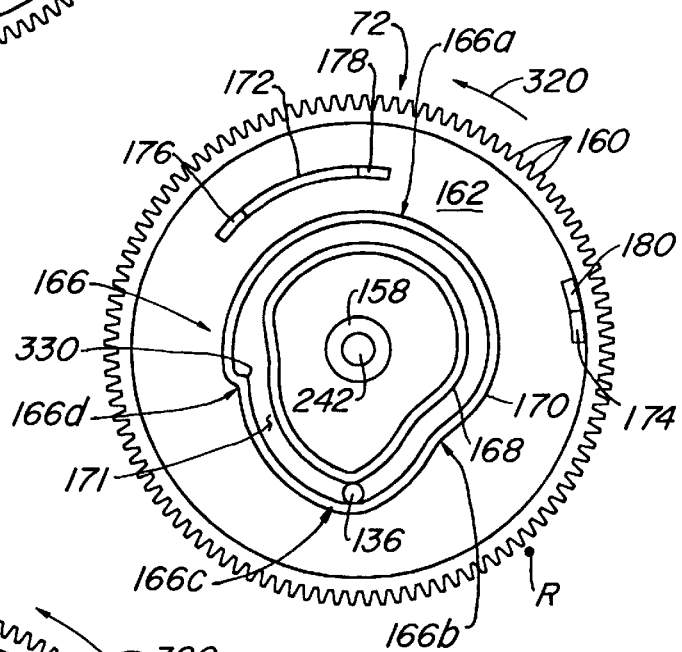
Figure 15B:
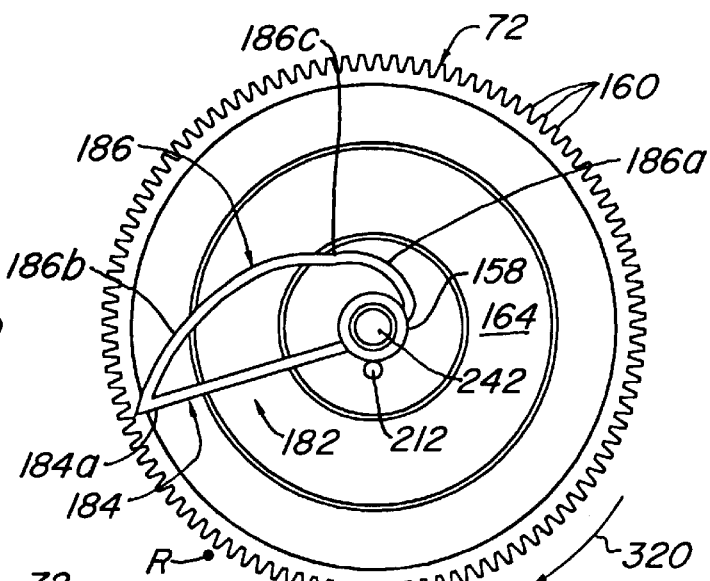

In response to an initial counterclockwise motor-driven rotation of the worm gear 72, as indicated by the arrows 320 in FIGS. 14B and 15B, the drive pin 136 is forced into the section 166c of the upper cam track 171, thereby forcibly driving the sled structure 66 (see FIGS. 7 and 8), and thus the latch arms 68, forwardly relative to the module housing 64. As can be seen in FIG. 15B, such further counterclockwise rotation of the worm gear 72 still does not bring the bottom cam structure 182 into forcible engagement with the ejection plate member drive pin 212. Accordingly, the ejection plate member 74 remains in its initial placement relative to the module housing 64.

Figure 16B:
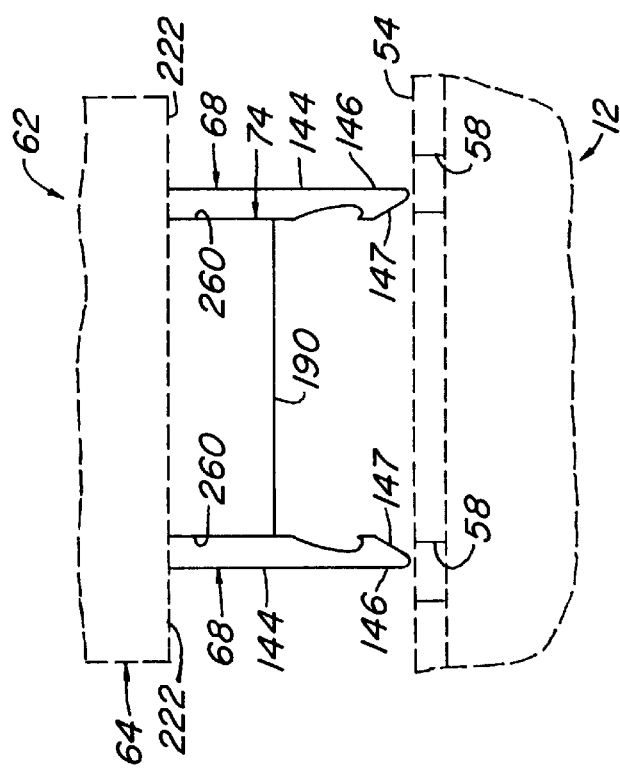

The initial forward driven movement of the latch arms 68, as indicated by the arrows 326 in FIG. 16B, causes the hooked outer ends 146 of the latch arms 68 to forwardly enter the rear computer wall latch openings 58, be cammed outwardly by the sloped outer end surfaces 147 as indicated by the arrows 328 in FIG. 16B, and then snap back (due to the action of the spring 156 shown in FIGS. 7 and 8) into locking engagement with the computer over the interior side surface of its rear side wall 54. During the worm gear rotation indicated in FIGS. 14B and 15B, the inner position sensing cam 172 (FIG. 14A) is moved out of engagement with its associated position switch button 110a, thereby terminating the sensing switch output signal 322 (FIG. 13).

Figure 14C:
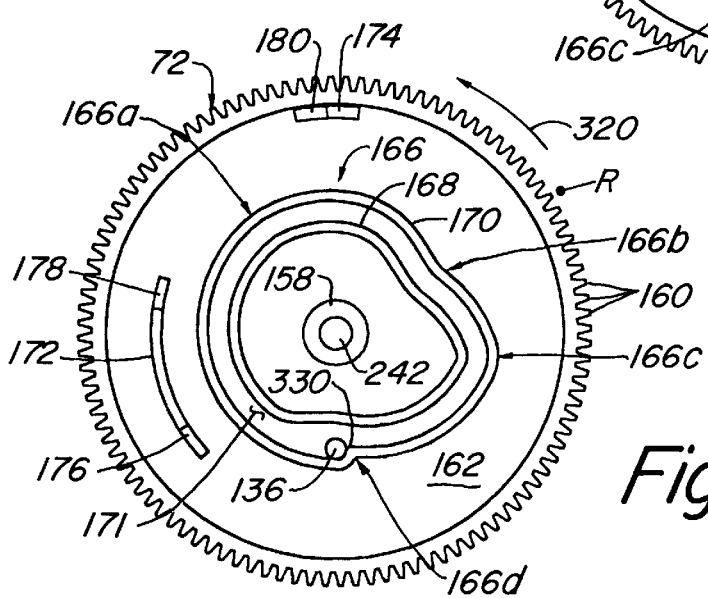
Figure 15C:
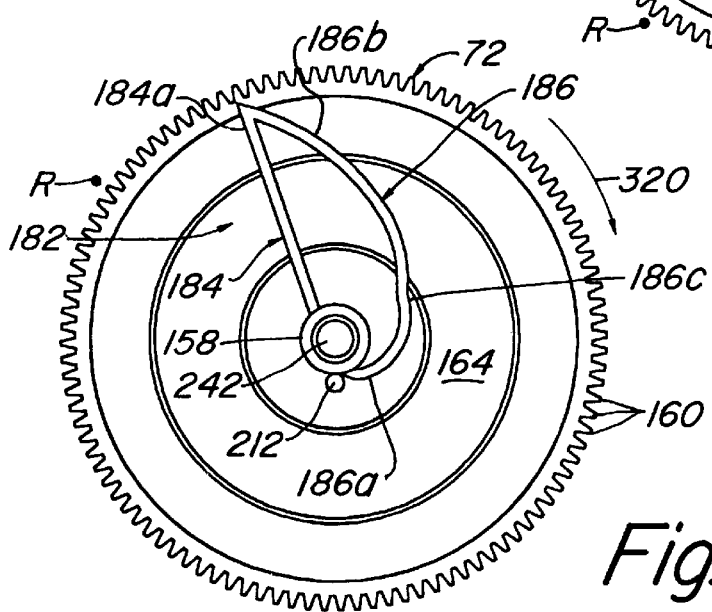

As shown in FIGS. 14C and 15C, the worm gear 72 then continues to be rotationally driven in a counterclockwise direction (as viewed from the top side of the worm gear) as indicated by the arrows 320, thereby pulling the drive pin 136 rearwardly (i.e., upwardly as viewed in FIG. 14C) as the drive pin traverses the cam track 171 from its section 166c to its section 166d, the sections 166c,166d being separated by a radially inwardly extending projection 330 formed in the outer cam track wall 170.

As the drive pin 136 passes through the cam track 171 from the track section 166c toward the track section 166d, the drive pin 136, and thus the latch arms 68 (see FIG. 16C) are forced rearwardly, thereby rearwardly driving the computer 12 toward the module 62 as indicated by the arrows 332 in FIG. 16C. This rearward driven movement of the computer 12 forcibly mates the docking station and computer connectors 34 and 56 (see FIG. 1) and brings the computer 12 to a docked relationship with the docking station 10.

In such docked orientation of the computer 12 the ejection plate member drive pin 212 is closely adjacent the bottom cam section 186a and ready to be forwardly driven thereby during a subsequent counterclockwise rotation of the worm gear 72. After the computer 12 is docked, the security hood plate 122 (as illustrated in phantom in FIG. 16C) overlies outer end portions of the latch arm sections 144 adjacent the rear side of the docked computer 12 and serves to block access to the latch arm sections 144 to hinder unauthorized unlatching thereof (by, for example, inserting a tool between the computer and docking station wall 32 and prying the latch arms away from one another) and removal of the docked computer.

The full docking of the computer 12 (i.e., full mating of the connectors 34 and 56) is designed to occur as the drive pin 136 (FIG. 14C) approaches, and before it passes over, the cam wall projection 330. As the drive pin 136 passes radially inwardly over the projection 330 it pulls the rear latch arm sections 140 further rearwardly to thereby create an approximately 2 millimeter "overdrive" movement in the latch arms 68 to assure full mating of the connectors 34,56 in the event that they are somewhat further apart (in a front-to-rear direction) than designed for.

If the connectors 34,56 are fully mated when this overdrive movement is initiated, the uniquely configured latch arms 68 themselves provide a protective spring force which prevents them from being broken or damaged by this additional force being imposed thereon during the docking process. Specifically, as this additional docking force is being imposed on the latch arms 68, their intermediate vertical sections 148 (see FIGS. 7 and 8) simply flex to absorb such additional force.

After the drive pin 136 (FIG. 14C) passes inwardly over the cam wall projection 330 it pops radially outwardly into its FIG. 14C position (due to the release of the resilient energy briefly stored in the intermediate latch arm sections 148), thereby relieving the stress on the latch arm sections 148 and bringing the module docking components to a "home docked" orientation. When the drive pin 136 reaches its FIG. 14C docked position in the upper cam track 171, the outer position sensing cam 174 engages and upwardly depresses the button 108a of its associated position sensing switch 108 (see FIGS. 6 and 13), thereby causing the switch 108 to transmit an electrical signal 334 to the motor control IC 306.

In response to the receipt of the signal 334, the motor control IC 306 (FIG. 13) terminates its output signal 318, thereby stopping the motor 78. As can be seen, either of the two switches 108 and 110 serves to terminate rotation of the motor 78 when such switch is initially contacted by its associated position sensing cam 172 or 174.

In accordance with a unique safety aspect of the present invention, the module 62 is operative to sense a "jamming" condition during docking and automatically reverse the drive motor rotation to return the components thereof to their undocked "home" orientation. More specifically, such a jamming condition might occur if a user, during the docking process, inserted a finger between the rearwardly moving computer and the facing wall of the docking station. Upon sensing an overcurrent condition resulting from this jam, the motor control IC 306 responsively alters its motor drive output signal 318 (FIG. 13) to reverse the rotation of the motor 78 and thereby rotate the worm gear 72 in a clockwise direction (as viewed from its top side) to return it to its FIG. 14A position in which the computer 12 is correspondingly returned rearwardly to its FIG. 16A "ready to dock" position.

Figure 14D:
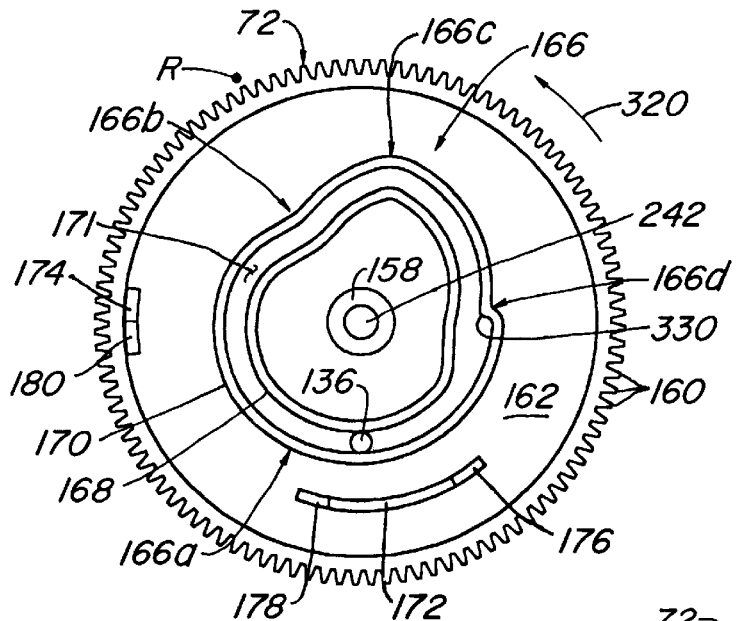
Figure 14E:
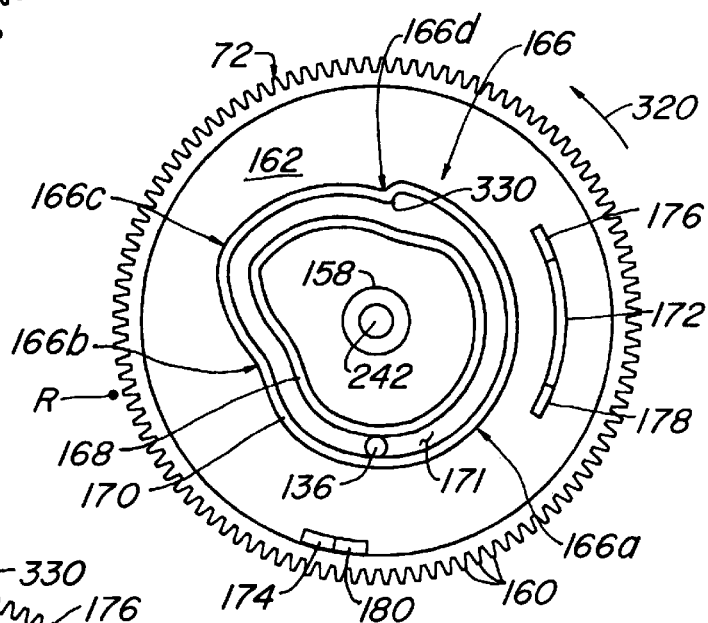
Figure 14F:
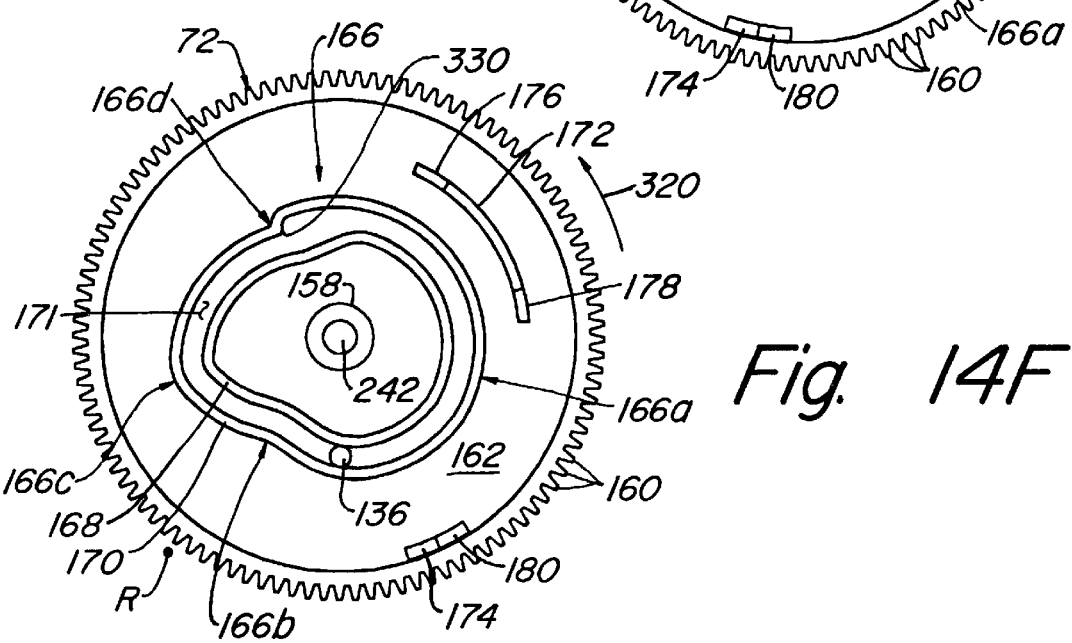
Figure 15D:
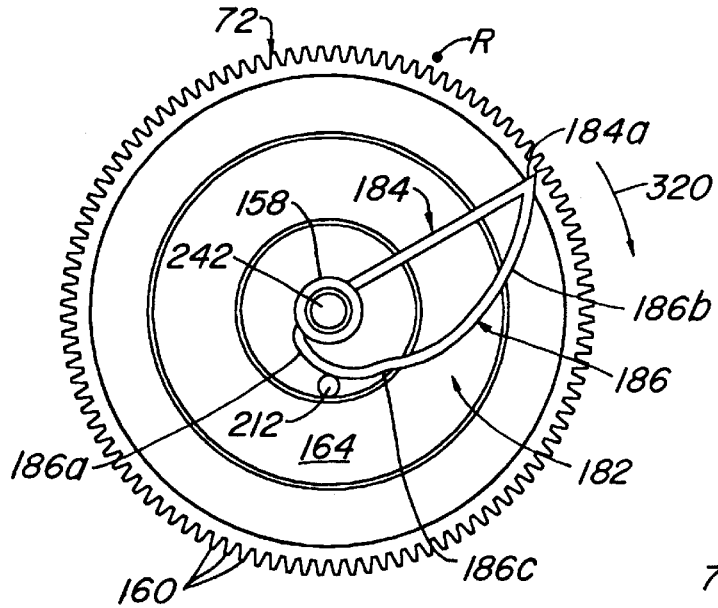
Figure 15E:
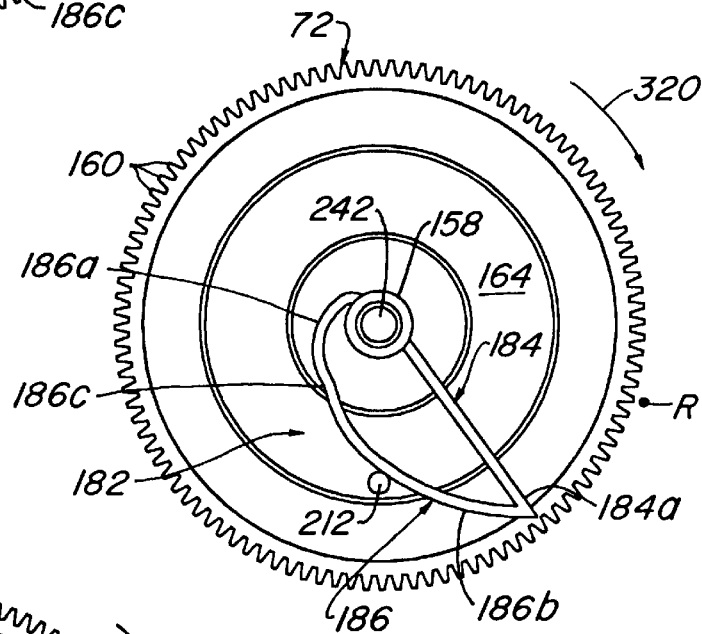
Figure 15F:
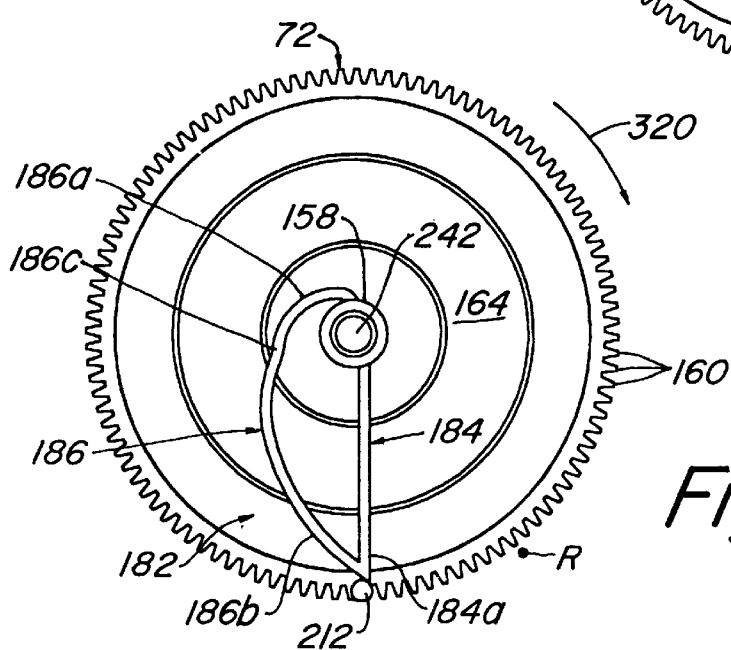

Turning now to FIGS. 14D, 15D and 16D, during periods when the computer 12 is operatively coupled to the docking station 10 (as shown in FIGS. 14C, 15C and 16C), the motor drive signal 318 from the motor control IC 306 is terminated. When it is desired to undock the computer 12 an undocking initiation signal 336 is appropriately transmitted by the user to the motor control IC 306 which responsively generates the drive signal 318 again to drive the worm gear 72 in the counterclockwise direction 320 away from its "home docked" orientation.

This initial counterclockwise worm gear rotation disengages the position sensing cam 174 from its associated switch 108a, thereby terminating the switch output signal 334 (FIG. 13), and causes the sled structure drive pin 136 (FIG. 14D) to traverse the upper cam track section 166a. Because the cam track section 166a is circular the position of the drive pin 136 is not changed. However, such initial rotation in a counterclockwise direction of the worm gear 72 causes the ejection plate member drive pin 212 to be engaged by the bottom cam section 186a (FIG. 15D) and driven forwardly, thereby also driving the ejection plate member 74 forwardly toward the docked computer 12 as indicated by the arrow 338 in FIG. 16D.

The initial forwardly driven movement of the ejection plate member 74 causes its sloping notch surfaces 194 (see FIG. 11) to slidingly engage the complementarily sloped latch arm surfaces 156 (see FIGS. 7 and 8), thereby outwardly camming the latch arms 68 as indicated by the arrows 340 in FIG. 16D and unlocking the hooked outer latch arm ends 146 from the interior side surface of the rear computer side wall 54.

Further counterclockwise driven rotation of the worm gear 72 (see FIGS. 14E, 15E and 16E) causes the drive pin 136 to further traverse the circular upper cam track section 166a, and the ejection plate member drive pin 212 to complete its traversal of the bottom cam section 186a. During this time the latch plate end 190 moves forwardly (as indicated by the arrow 342 in FIG. 16E) into engagement with the rear side of the computer 12 and drives the computer 12 forwardly, as indicated by the arrow 344 in FIG. 16E, to forcibly decouple the docking station and computer connectors 34 and 56 and withdraw the hooked latch arm ends 146 from the rear computer side wall openings 58.

Still further counterclockwise driven rotation of the worm gear 72 causes the lower drive pin 212 to engage and traverse the lower cam section 186b and cause the latch plate member 74 to forwardly move the computer 12, at a faster rate, further away from the module 62. Continued driven counterclockwise rotation of the worm gear 72 (see FIGS. 14F and 15F) continues to move the upper drive pin 136 through the circular upper cam track section 166a while continuing to move the lower drive pin 212 along the bottom cam section 186b toward its outer end. At the same time, the latch plate member 74 continues to forwardly move the computer 12 further away from the module 62.

When the lower drive pin 212 outwardly passes the outer end of the bottom cam structure 182, the spring 262 (FIG. 11) drives the latch plate 74 back to its starting position, thereby permitting the spring 156 (see FIGS. 7 and 8) to return the latch arms 68 to their originally parallel relationship. A final degree of driven counterclockwise rotation of the worm gear 72 returns the worm gear, and the upper and lower drive pins 136 and 212, to their "home undocked" positions shown in FIGS. 14A and 14B. The return of the worm gear 72 to this position causes the position sensing cam 172 to re-engage and upwardly depress the button 110a of its associated position sensing switch 110 (see FIGS. 6 and 13), at which time the switch 110 generates its output signal 322 (FIG. 13) to stop the motor 78 as previously described, thereby readying the module 62 for subsequent docking cycle.

Turning now to FIG. 17, the previously described ejection lever member 70 may be used to manually unlatch the docked computer from the docking station 10 if, for example, a power outage occurs. To manually unlatch the computer, a rear wall portion of the docking station (which may be lockable if desired) is removed to provide manual access to the outwardly projecting rear tab portion 286 of the lever member 70. Tab portion 286 is then manually pivoted in a counterclockwise direction, as indicated by the arrow 346, to thereby cause the tab portion 288 to forwardly drive the ejection plate member 74 as indicated by the arrow 348. This forward driven movement of the ejection plate member 74 outwardly pivots the latch arms 68 (see FIG. 16D) and allows the user to manually undock the computer 12 by pulling it away from the module 62.

When power is restored, the worm gear 72 and the other module components are in their previously described "home docked" orientations shown in FIGS. 14C, 15C and 16C. However, the computer 12 has been removed. In this event the motor control IC 306 (FIG. 13) senses the absence of the docking station IC output signal 316 (caused by the absence of the computer "presence" signal 314) and, via the drive signal 318, responsively causes the drive motor to reverse until the worm gear 72 and the other module components are brought back to their "home undocked" positions shown in FIGS. 14A, 15A and 16A in readiness for a subsequent motorized re-docking of the portable computer 12.

SUMMARY

The motorized docking/undocking module 62 of the present invention provides a variety of advantages over conventional motorized docking systems. For example, compared to conventional mechanical docking/undocking drive designs the modular drive system of the present invention is considerably simpler and utilizes fewer parts. This, in turn provides improved reliability and desirably reduced tolerance "stack-up". Exemplary of the enhanced simplicity of the motorized drive module of the present invention is the creation of both the docking and undocking movements of the module by rotation of its cammed worm gear component in the same direction.

The modular construction of the drive system makes it far easier to install in, and subsequently remove from, the docking station housing—all that is required is a simple latching and unlatching operation. The modular drive system of the present invention is also easier to use since no large manual force is required to initiate either the docking or undocking sequence. Moreover, enhanced initial connector alignment accuracy is provided via the use of the elongated outer connector end pins and sockets, and the requirement for both end connection signals prior to initiation of the docking process.

Docking reliability is also improved via the previously described "overdrive" movement imparted to the specially configured latch arm portions of the module. Docking safety is also improved via the previously described jam/overcurrent sensing and drive motor reversal feature built into the docking control system.

The foregoing detailed description is to be clearly understood as being given by way of illustration and example only, the spirit and scope of the present invention being limited solely by the appended claims.

What is claimed is:

1. A motorized docking/undocking module connectable to a portable computer docking station having a first electrical connector thereon, said module being operative to forcibly couple the first electrical connector to, and uncouple it from, a second electrical connector on a portable computer placed on the docking station, said module comprising:

a support structure having a connection portion securable to the docking station;

a latching structure carried by said support structure for driven translational motion relative thereto through a docking movement in which said latching structure engages the computer and forcibly moves the computer toward the first electrical connector in a manner coupling the first and second electrical connectors;

an ejection structure carried by said support structure for driven translational motion relative thereto, and relative to said latching structure, through an undocking movement in which said ejection structure disengages the computer from said latching structure, by engaging and deflecting a portion of said latching structure, and forcibly moves the computer away from the first electrical connector in a manner uncoupling the first and second electrical connectors; and a drive structure operative to sequentially force said latching and ejection structures through said docking and undocking movements thereof, said drive structure including:

a linking member drivingly interconnected between said latching and ejection structures, and an electric drive motor carried by said support structure and drivingly coupled to said linking member.

2. The motorized docking/undocking module of claim 1 wherein:

said connection portion is defined by a resiliently deflectable portion of said support structure that is releasably latchable to a corresponding portion of the docking station.

17

3. The motorized docking/undocking module of claim 1 wherein:

said ejection structure includes an ejection plate member carried by said support structure for driven translational movement relative thereto toward and away from the computer.

4. The motorized docking/undocking module of claim 1 wherein:

said linking member is a first gear having a first side with circumferentially spaced apart first and second position sensing cam structures disposed thereon in a radially offset relationship with one another, and said motorized docking/undocking module further comprises first and second position sensing switches carried on said support structure for sequential engagement and activation by said first and second position sensing cam structures in response to driven rotation of said first gear by said electric drive motor.

5. The motorized docking/undocking module of claim 1 further comprising:

an ejection member carried by said support structure and being manually movable relative thereto in a manner engaging said ejection structure and manually forcing it through an initial portion of said undocking movement thereof.

6. A motorized docking/undocking module connectable to a portable computer docking station having a first electrical connector thereon, said module being operative to forcibly couple the first electrical connector to, and uncouple it from, a second electrical connector on a portable computer placed on the docking station, to thereby sequentially dock and undock the portable computer, said module comprising:

a housing having a connection portion securable to the docking station;

latching and election apparatus, carried by said housing and drivable to sequentially engage, dock, undock and be disengaged from the portable computer; and an electric drive motor carried by said housing, said electric drive motor being drivingly connected to said latching and election apparatus and having a body portion, said housing having a wall structure engaging said body portion in a manner restraining it against appreciable rotational and translational movement relative to said housing without the use of separate fastening members interconnecting said body portion and said housing.

7. The motorized docking/undocking module of claim 6 wherein:

said body portion extends along an axis and has a first end through which said axis extends and from which a spaced pair of electrical connection tabs axially project, and said wall structure has a surface area that serves as an abutment for said tabs in a manner precluding appreciable rotational movement of said body portion, about said axis, relative to said housing.

8. The motorized docking/undocking module of claim 7 wherein:

said wall structure has a spaced pair of edge notches formed therein, defining said surface area, and receiving said electrical connection tabs.

9. The motorized docking/undocking module of claim 6 wherein:

said body portion has an end from which a drive shaft axially projects, and a cylindrical boss disposed on said body portion end coaxially with an inner end portion of said drive shaft, and said wall structure includes a housing wall section with an opening therein that receives said boss in a manner restraining translational movement of said body portion toward the outer end of said drive shaft and transversely to said drive shaft.

10. A motorized docking/undocking module connectable to a portable computer docking station having a first electrical connector thereon, said module being operative to forcibly couple the first electrical connector to, and uncouple it from, a second electrical connector on a portable computer placed on the docking station, to thereby sequentially dock and undock the portable computer, said module comprising:

a support structure securable to the docking station;

a latching structure carried by said support structure for driven motion relative thereto through a docking movement in which said latching structure engages the computer and forcibly moves the portable computer toward the first electrical connector to couple the first and second electrical connectors;

an election structure carried by said support structure for driven motion relative thereto, and relative to said latching structure, through an undocking movement in which said election structure disengages the computer from said latching structure and forcibly moves the computer away from the first electrical connector to uncouple the first and second electrical connectors; and a drive structure operative to sequentially force said latching and ejection structures through said docking and undocking movements thereof, said latching structure including:

a generally plate-shaped sled structure carried by said support structure for driven translation relative thereto in a first direction and having opposite side edge portions extending in said first direction, and a pair of elongated latch arm members having front end portions with outer ends configured to latchingly engage the portable computer, and rear end portions secured to said sled structure for pivotal movement relative thereto, in planes generally parallel to said sled structure, between a first position, toward which said rear end portions are resiliently biased, in which said rear end portions longitudinally extend along said opposite side edge portions, and a second position in which said rear end portions are pivoted away from one another in a manner increasing the distance between said front end portions.

11. The motorized docking/undocking module of claim 10 wherein:

said outer ends of said front end portions of said latch arm members have hooked configurations.

12. The motorized docking/undocking module of claim 10 wherein, in each of said latch arm members:

said front end portion is laterally offset from said rear end portion and joined thereto by a longitudinally intermediate latch arm portion transverse to said front and rear end portions.

13. The motorized docking/undocking module of claim 10 wherein said ejection structure includes:

an ejection plate member carried by said support structure for translational movement relative thereto toward the computer, to engage and forcibly decouple it from the docking station, and then away from the decoupled computer, said ejection plate member being configured to engage said latch arm members, during its movement toward the computer, in a manner forcibly pivoting them from their first position to their second position.

14. A motorized docking/undocking module connectable to a portable computer docking station having a first electrical connector thereon, said module being operative to forcibly couple the first electrical connector to, and uncouple it from, a second electrical connector on a portable computer placed on the docking station, said module comprising:

a support structure having a connection portion securable to the docking station;

a latching structure carried by said support structure for driven motion relative thereto through a docking movement in which said latching structure engages the computer and forcibly moves the computer toward the first electrical connector;

an ejection structure carried by said support structure for driven motion relative thereto, and relative to said latching structure, through an undocking movement in which said ejection structure disengages the computer from said latching structure and forcibly moves the computer away from the first electrical connector; and a drive structure operative to sequentially force said latching and ejection structures through said docking and undocking movements thereof, said drive structure including a linking member drivingly interconnected between said latching and ejection structures, and an electric drive motor carried by said support structure and drivingly coupled to said linking member, said linking member being a first gear having first and second cam structures thereon, said drive structure further including a second gear drivably coupled to said electric drive motor and operatively meshed with said first gear, said latching structure being drivably associated with said first cam structure, and said ejection structure being drivably associated with said second cam structure.

15. The motorized docking/undocking module of claim 14 wherein:

said first and second cam structures are configured and positioned on said first gear in a manner such that driven rotation of said first gear in a single direction is operative to respectively impart said docking and undocking movements to said latching and ejection structures.

16. The motorized docking/undocking module of claim 14 wherein:

said first gear has first and second opposite sides upon which said first and second cam structures are respectively disposed, said latching structure has a portion positioned on said first side of said first gear and having a first drive pin positioned to be engaged and forcibly moved by said first cam structure, and said ejection structure has a portion positioned on said second side of said first gear and having a second drive pin positioned to be engaged and forcibly moved by said second cam structure.

17. A motorized docking/undocking module useable in conjunction with a portable computer docking station having a first electrical connector thereon, said module being operative to forcibly couple the first electrical connector to, and uncouple it from, a second electrical connector on a portable computer placed on the docking station, said module comprising:

a housing mountable on the docking station;

a gear rotatable associated with said housing and having opposite first and second sides, a first cam structure disposed on said first side, and a second cam structure disposed on said second side;

a pair of latch arm members engageable and disengageable with the portable computer, said pair of latch arm members being linked to said first cam structure for driven movement thereby, in response to driven rotation of said gear, away from and toward said housing;

an ejection plate member engageable and disengageable with the portable computer and linked to said second cam structure for driven movement thereby, in response to driven rotation of said gear and independently of said pair of latch arm members, away from and toward said housing; and an electric drive motor carried by said housing and drivingly linked to said gear to selectively rotate it.

18. The motorized docking/undocking module of claim 17 wherein:

said housing has a resiliently depressible latch portion operative to removably connect said housing to the docking station.

19. The motorized docking/undocking module of claim 17 wherein:

said gear is a worm gear, and said electric drive motor is drivingly linked to said worm gear by a drive worm operatively meshed with said worm gear.

20. The motorized docking/undocking module of claim 17 wherein:

each of said latch arm members has parallel, laterally offset front and rear longitudinal portions interconnected by a transverse intermediate longitudinal portion, with said front longitudinal portion having a hooked outer end section.

21. The motorized docking/undocking module of claim 17 wherein:

said first and second cam structures are relatively positioned and configured to sequentially translate said latch arm members and said ejection plate member relative to said housing in response to driven rotation of said gear in a single direction.

22. The motorized docking/undocking module of claim 17 further comprising:

circumferentially spaced apart first and second position sensing cam structures disposed on one of said first and second sides of said gear in a radially offset relationship with one another, and first and second position sensing switches carried on said housing for sequential engagement and activation by said first and second position sensing cam structures in response to driven rotation of said gear by said electric drive motor.

23. The motorized docking/undocking module of claim 17 further comprising:

an ejection member carried by said housing and being manually movable relative thereto in a manner engaging said ejection plate member and manually forcing it toward the computer.

24. A motorized docking/undocking module useable in conjunction with a portable computer docking station having a first electrical connector thereon, said module being operative to forcibly couple the first electrical connector to, and uncouple it from, a second electrical connector on a portable computer placed on the docking station, said module comprising:

a housing mountable on the docking station;

a gear rotatable associated with said housing and having opposite first and second sides, a first cam structure disposed on said first side, and a second cam structure disposed on said second side;

a pair of latch arm members engageable and disengageable with the computer and supported by said housing for driven movement relative thereto by said first cam structure, in response to driven rotation of said gear;

an election plate member engageable and disengageable with the computer and supported by said housing for driven movement relative thereto by said second cam structure, in response to driven rotation of said gear; and an electric drive motor carried by said housing and drivingly linked to said gear to selectively rotate it, said electric drive motor having a body portion, and said housing having a wall portion engaging said body portion and restraining it against appreciable translational and rotational movement relative to said housing without the use of separate fastening members.

25. Portable computer docking station apparatus comprising:

a docking station housing having a wall upon which a first electrical connector is mounted, and a receiving area along which a portable computer having a second electrical connector may be moved toward and away from the first electrical connector to respectively couple and uncouple the first and second electrical connectors; and a motorized docking/undocking module operative to engage and forcibly move the portable computer along said receiving area, toward and away from the first electrical connector, in a manner respectively coupling and uncoupling the first and second electrical connectors, said module including:

a support structure secured to said docking station housing;

a latching structure carried by said support structure for driven translational motion relative thereto through a docking movement in which said latching structure engages the portable computer and forcibly moves the portable computer toward the first electrical connector to couple the first and second electrical connectors;

an ejection structure carried by said support structure for driven translational motion relative thereto, and relative to said latching structure, through an undocking movement in which said ejection structure disengages the portable computer from said latching structure, by engaging and deflecting a portion of said latching structure, and forcibly moves the portable computer away from the first electrical connector to uncouple the first and second electrical connectors; and a drive structure operative to sequentially force said latching and ejection structures through said docking and undocking movements thereof, said drive structure including:

a linking member drivingly interconnected between said latching and ejection structures, and an electric drive motor carried by said support structure and drivingly coupled to said linking member; and a control system operable to selectively energize and de-energize said electric drive motor.

26. The portable computer docking station apparatus of claim 25 wherein:

said support structure has connection portion defined by a resiliently deflectable portion of said support structure that is releasably latched to a corresponding portion of said docking station wall.

27. The portable computer docking station apparatus of claim 25 wherein:

said ejection structure includes an ejection plate member carried by said support structure for driven translational movement relative thereto toward and away from the computer.

28. The portable computer docking station apparatus of claim 25 wherein:

said linking member is a first gear having a first side with circumferentially spaced apart first and second position sensing cam structures disposed thereon in a radially offset relationship with one another, and said motorized docking/undocking module further comprises first and second position sensing switches carried on said support structure for sequential engagement and activation by said first and second position sensing cam structures in response to driven rotation of said first gear by said electric drive motor.

29. The portable computer docking station apparatus of claim 28 wherein:

said first position sensing switch is operative to output a first electrical signal when engaged by said first position sensing cam structure, said second position sensing switch is operative to output a second electrical signal when engaged by said second position sensing cam structure, and said control system is further operative to terminate the rotation of said electric drive motor in response to the generation of either of said first and second electrical signals.

30. The portable computer docking station apparatus of claim 25 further comprising:

an ejection member carried by said support structure and being manually movable relative thereto in a manner engaging said ejection structure and manually forcing it through an initial portion of said undocking movement thereof.

31. The portable computer docking station apparatus of claim 25 wherein:

said control system, during driven movement of the portable computer toward said first electrical connector by said module, being further operable to sense the presence of a foreign object being pressed between said docking station housing and the portable computer and responsively reverse the rotation of said electrical drive motor to move the portable computer away from said first electrical connector.

32. The portable computer docking station apparatus of claim 25 wherein:

said latching structure, said ejection structure, and said linking member have home undocked positions and home docked positions, and said control system is operable to receive a presence signal from the portable computer, and is further operable, when said latching structure, said ejection structure and said linking member are in said home docked positions, and said presence signal is not being received by said control system, to return said latching structure, said ejection structure and said linking member to said home undocked positions thereof.

33. The portable computer docking station apparatus of claim 25 wherein:

said latching structure includes a pair of elongated latch arm members each having a rear end portion drivably connected to said linking member, a front end portion generally parallel to and laterally offset from said rear end portion and latchable to the portable computer, and an intermediate portion transverse to and interconnecting said front and rear end portion.

34. Portable computer docking station apparatus comprising:

a docking station housing having a wall upon which a first electrical connector is mounted, and a receiving area along which a portable computer having a second electrical connector may be moved toward and away from the first electrical connector to respectively couple and uncouple the first and second electrical connectors; and a motorized docking/undocking module operative to engage and forcibly move the portable computer along said receiving area, toward and away from the first electrical connector, in a manner respectively coupling and uncoupling the first and second electrical connectors, said module including:

a support structure secured to said docking station housing;

latching and ejection apparatus carried by said support structure, interconnected by a linking member, and drivable to sequentially engage, dock, undock and be disengaged from the portable computer;

an electric drive motor carried by said support structure and drivingly coupled to said linking member; and a control system operable to selectively energize and deenergize said electric drive motor, said electric drive motor having a body portion, and said support structure being a module housing having a wall structure engaging said body portion in a manner restraining it against appreciable rotational and translational movement relative to said module housing without the use of separate fastening members interconnecting said body portion and said module housing.

35. The portable computer docking station apparatus of claim 34 wherein:

said body portion extends along an axis and has a first end through which said axis extends and from which a spaced pair of electrical connection tabs axially project, and said wall structure has a surface area that serves as an abutment for said tabs in a manner precluding appreciable rotational movement of said body portion, about said axis, relative to said module housing.

36. The portable computer docking station apparatus of claim 35 wherein:

said wall structure has a spaced pair of edge notches formed therein, defining said surface area, and receiving said electrical connection tabs.

37. The portable computer docking station apparatus of claim 34 wherein:

said body portion has an end from which a drive shaft axially projects, and a cylindrical boss disposed on said body portion end coaxially with an inner end portion of said drive shaft, and said wall structure includes a module housing wall section with an opening therein that receives said boss in a manner restraining translational movement of said body portion toward the outer end of said drive shaft and transversely to said drive shaft.

38. Portable computer docking station apparatus comprising:

a docking station housing having a wall upon which a first electrical connector is mounted, and a receiving area along which a portable computer having a second electrical connector may be moved toward and away from the first electrical connector to respectively couple and uncouple the first and second electrical connectors; and a motorized docking/undocking module operative to engage and forcibly move the portable computer along said receiving area, toward and away from the first electrical connector, in a manner respectively coupling and uncoupling the first and second electrical connectors, said module including:

a support structure secured to said docking station housing, a latching structure carried by said support structure for driven motion relative thereto through a docking movement in which said latching structure engages the portable computer and forcibly moves the portable computer toward the first electrical connector, an ejection structure carried by said support structure for driven motion relative thereto, and relative to said latching structure, through an undocking movement in which said ejection structure disengages the portable computer from said latching structure and forcibly moves the portable computer away from the first electrical connector, and a drive structure operative to sequentially force said latching and ejection structures through said docking and undocking movements thereof, said drive structure including an electric drive motor carried by said support structure and drivingly coupled to said latching and ejection structures, and a control system operable to selectively energize and de-energize said electric drive motor, said latching structure including:

a generally plate-shaped sled structure carried by said support structure for driven translation relative thereto in a first direction and having opposite side edge portions extending in said first direction, and a pair of elongated latch arm members having front end portions with outer ends configured to latchingly engage the portable computer, and rear end portions secured to said sled structure for pivotal movement relative thereto, in planes generally parallel to said sled structure, between a first position, toward which said rear end portions are resiliently biased, in which said rear end portions longitudinally extend along said opposite side edge portions, and a second position in which said rear end portions are pivoted away from one another in a manner increasing the distance between said front end portions.

39. The portable computer docking station apparatus of claim 38 wherein:

said outer ends of said front end portions of said latch arm members have hooked configurations.

40. The portable computer docking station apparatus of claim 38 wherein, in each of said latch arm members:

said front end portion is laterally offset from said rear end portion and joined thereto by a longitudinally intermediate latch arm portion transverse to said front and rear end portions.

41. The portable computer docking station apparatus of claim 38 wherein said ejection structure includes:
an ejection plate member carried by said support structure for translational movement relative thereto toward the computer, to engage and forcibly decouple it from the docking station, and then away from the decoupled computer, said ejection plate member being configured to engage said latch arm members, during its movement toward the computer, in a manner forcibly pivoting them from their first position to their second position.

42. Portable computer docking station apparatus comprising:
a docking station housing having a wall upon which a first electrical connector is mounted, and a receiving area along which a portable computer having a second electrical connector may be moved toward and away from the first electrical connector to respectively couple and uncouple the first and second electrical connectors; and
a motorized docking/undocking module operative to engage and forcibly move the portable computer along said receiving area, toward and away from the first electrical connector, in a manner respectively coupling and uncoupling the first and second electrical connectors, said module including:
a support structure secured to said docking station housing;
a latching structure carried by said support structure for driven motion relative thereto through a docking movement in which said latching structure engages the portable computer and forcibly moves the portable computer toward the first electrical connector;
an election structure carried by said support structure for driven motion relative thereto, and relative to said latching structure, through an undocking movement in which said ejection structure disengages the portable computer from said latching structure and forcibly moves the portable computer away from the first electrical connector; and
a drive structure operative to sequentially force said latching and ejection structures through said docking and undocking movements thereof, said drive structure including a linking member drivingly interconnected between said latching and ejection structures, and an electric drive motor carried by said support structure and drivingly coupled to said linking member; and
a control system operable to selectively energize and de-energize said electric drive motor,
said linking member being a first gear having first and second cam structures thereon,
said drive structure further including a second sear drivably coupled to said electric drive motor and operatively meshed with said first gear,
said latching structure being drivably associated with said first cam structure, and
said ejection structure being drivably associated with said second cam structure.

43. The portable computer docking station apparatus of claim 42 wherein:
said first and second cam structures are configured and positioned on said first gear in a manner such that driven rotation of said first gear in a single direction is operative to respectively impart said docking and undocking movements to said latching and ejection structures.

44. The portable computer docking station apparatus of claim 42 wherein:
said first gear has first and second opposite sides upon which said first and second cam structures are respectively disposed,
said latching structure has a portion positioned on said first side of said first gear and having a first drive pin positioned to be engaged and forcibly moved by said first cam structure, and
said ejection structure has a portion positioned on said second side of said first gear and having a second drive pin positioned to be engaged and forcibly moved by said second cam structure.

45. Portable computer docking station apparatus comprising:
a docking station housing having a wall upon which a first electrical connector is mounted, and a receiving area along which a portable computer having a second electrical connector may be moved toward and away from the first electrical connector to respectively couple and uncouple the first and second electrical connectors; and
a motorized docking/undocking module operative to engage and forcibly move the portable computer alone said receiving area, toward and away from the first electrical connector, in a manner respectively coupling and uncoupling the first and second electrical connectors, said module including:
a support structure secured to said docking station housing;
a latching structure carried by said support structure for driven motion relative thereto through a docking movement in which said latching structure engages the computer and forcibly moves the computer toward the first electrical connector;
an election structure carried by said support structure for driven motion relative thereto through an undocking movement in which said election structure disengages the computer from said latching structure and forcibly moves the computer away from the first electrical connector; and
a motorized drive structure operative to sequentially force said latching and election structures through said docking and undocking movements thereof,
said latching structure including a pair of latch arm members having outer end portions latchably engageable with the portable computer, and
said portable computer docking station apparatus further comprising a security hood member carried by said support structure and positioned to overlie and block access to said outer latch member end portions when said first and second electrical connectors are operatively coupled to one another.

46. Portable computer docking station apparatus comprising:
a docking station housing having a wall upon which a first electrical connector is mounted, and a receiving area along which a portable computer having a second electrical connector may be moved toward and away from the first electrical connector to respectively couple and uncouple the first and second electrical connectors; and
a motorized docking/undocking module operative to engage and forcibly move the portable computer along said receiving area, toward and away from the first electrical connector, in a manner respectively coupling and uncoupling the first and second electrical connectors, said module including:
- a support structure secured to said docking station housing;
- a latching structure carried by said support structure for driven motion relative thereto through a docking movement in which said latching structure engages the computer and forcibly moves the computer toward the first electrical connector;
- an election structure carried by said support structure for driven motion relative thereto through an undocking movement in which said election structure disengages the computer from said latching structure and forcibly moves the computer away from the first electrical connector; and
- a drive structure operative to sequentially force said latching and election structures through said docking and undocking movements thereof, said drive structure including an electric drive motor coupled to said latching and ejection structures; and a control system operable to selectively energize and de-energize said electric drive motor, said first electrical connector having first and second opposite end portions, and a central portion disposed between said first and second opposite end portions, mateable with corresponding portions of the second electrical connector, said first and second opposite end portions being configured to mate with the second electrical connector before said central portion does, said first electrical connector being operative to output first and second electrical signals respectively indicative of the mating of said first and second opposite end portions of said first electrical connector with said corresponding portions of the second electrical connector, and said control system being further operable to prevent energization of said electric drive motor until both of said first and second electrical signals are generated.

47. Portable computer docking station apparatus comprising:
- a docking station housing having a wall upon which a first electrical connector is mounted, and a receiving area along which a portable computer having a second electrical connector may be moved toward and away from the first electrical connector to respectively couple and uncouple the first and second electrical connectors; and
- a motorized docking/undocking module operative to engage and forcibly move the portable computer along said receiving area, toward and away from the first electrical connector, in a manner respectively coupling and uncoupling the first and second electrical connectors, said module including:
  - a support structure secured to said docking station housing;
  - a latching structure carried by said support structure for driven motion relative thereto through a docking movement in which said latching structure engages the computer and forcibly moves the computer toward the first electrical connector;
  - an election structure carried by said support structure for driven motion relative thereto through an undocking movement in which said election structure disengages the computer from said latching structure and forcibly moves the computer away from the first electrical connector; and
  - a drive structure operative to sequentially force said latching and election structures through said docking and undocking movements thereof, said drive structure including:
    - a linking member drivingly interconnected between said latching and ejection structures, and
    - an electric drive motor carried by said support structure and drivingly coupled to said linking member; and a control system operable to selectively energize and de-energize said electric drive motor, said latching structure including a pair of elongated latch arm members each having a rear end portion drivably connected to said linking member, a front end portion generally parallel to and laterally offset from said rear end portion and latchable to the portable computer, and an intermediate portion transverse to and interconnecting said front and rear end portion, said linking member being operative, while said latch arm members are latched to the portable computer, to (1) forcibly move said rear latch arm portions, in a first direction, in a manner driving the computer toward said first electrical connector through a first distance predetermined as necessary to fully mate the first and second electrical connectors, (2) further move said rear latch arm portions, in said first direction, through a second distance, in a manner causing resilient deflection of said intermediate latch arm member portions, and then (3) terminate the driving force on said rear latch arm member portions to cause the relaxation of said resilient deflection of said intermediate latch arm member portions.

* * * * *